(12) United States Patent
Kim et al.

(10) Patent No.: US 11,705,746 B2
(45) Date of Patent: *Jul. 18, 2023

(54) RECEIVER FOR WIRELESS CHARGING SYSTEM OF A PORTABLE COMMUNICATION DEVICE

(71) Applicant: Samsung Electronics Co., Ltd., Suwon-si (KR)

(72) Inventors: Si-Han Kim, Gwangju-si (KR); Gi-Yong Na, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

This patent is subject to a terminal disclaimer.

(21) Appl. No.: 17/232,889

(22) Filed: Apr. 16, 2021

(65) Prior Publication Data

US 2021/0234410 A1    Jul. 29, 2021

Related U.S. Application Data

(63) Continuation of application No. 16/919,817, filed on Jul. 2, 2020, now Pat. No. 11,018,531, which is a
(Continued)

(30) Foreign Application Priority Data

| Jan. 9, 2012 | (KR) | 10-2012-0002291 |
| May 7, 2012 | (KR) | 10-2012-0048052 |
| Aug. 7, 2012 | (KR) | 10-2012-0086193 |

(51) Int. Cl.
*H01M 10/46* (2006.01)
*H02J 7/00* (2006.01)
(Continued)

(52) U.S. Cl.
CPC ........... *H02J 7/0042* (2013.01); *H01F 27/02* (2013.01); *H01F 27/245* (2013.01);
(Continued)

(58) Field of Classification Search
CPC .......... H02J 50/40; H02J 50/005; H02J 50/10; H02J 50/12; H02J 50/70; H02J 50/80;
(Continued)

(56) References Cited

U.S. PATENT DOCUMENTS

| 7,944,171 B2 | 5/2011 | Yeh |
| 7,948,208 B2 | 5/2011 | Partovi et al. |

(Continued)

FOREIGN PATENT DOCUMENTS

| EP | 2328254 | 6/2011 |
| EP | 2367262 A2 | 9/2011 |

(Continued)

OTHER PUBLICATIONS

European Search Report dated Mar. 11, 2022; European Appln. No. 19 190 032.3-1202.

(Continued)

*Primary Examiner* — Edward Tso
(74) *Attorney, Agent, or Firm* — Jefferson IP Law, LLP

(57) ABSTRACT

A receiver for a wireless charging system, capable of receiving power energy using non-contact type magnetic induction, includes a coil capable of receiving the power energy and a part for generating a predetermined output power from the power energy received by the coil, a portable terminal, an NFC coil further provided outside of the coil, and a ferrite sheet further provided at the coil and the NFC coil.

6 Claims, 35 Drawing Sheets

Related U.S. Application Data continuation of application No. 16/588,092, filed on Sep. 30, 2019, now Pat. No. 10,944,298, which is a continuation of application No. 16/364,371, filed on Mar. 26, 2019, now Pat. No. 10,491,049, which is a continuation of application No. 16/036,082, filed on Jul. 16, 2018, now Pat. No. 10,284,023, which is a continuation of application No. 15/478,582, filed on Apr. 4, 2017, now Pat. No. 10,050,478, which is a continuation of application No. 15/201,915, filed on Jul. 5, 2016, now Pat. No. 9,653,942, which is a continuation of application No. 14/369,350, filed as application No. PCT/KR2013/000147 on Jan. 9, 2013, now Pat. No. 9,413,191.

(51) Int. Cl.

| | | |
|---|---|---|
| *H02J 50/10* | (2016.01) | |
| *H02J 50/12* | (2016.01) | |
| *H02J 50/80* | (2016.01) | |
| *H02J 50/70* | (2016.01) | |
| *H02J 50/00* | (2016.01) | |
| *H02J 50/40* | (2016.01) | |
| *H01F 27/28* | (2006.01) | |
| *H04B 1/3827* | (2015.01) | |
| *H04M 1/03* | (2006.01) | |
| *H01F 27/02* | (2006.01) | |
| *H01F 27/245* | (2006.01) | |
| *H01F 38/14* | (2006.01) | |
| *H01Q 1/38* | (2006.01) | |
| *H01Q 7/06* | (2006.01) | |
| *H04B 5/00* | (2006.01) | |
| *H04M 1/02* | (2006.01) | |

(52) U.S. Cl.
CPC ..... *H01F 27/2804* (2013.01); *H01F 27/2828* (2013.01); *H01F 38/14* (2013.01); *H01Q 1/38* (2013.01); *H01Q 7/06* (2013.01); *H02J 7/0044* (2013.01); *H02J 50/005* (2020.01); *H02J 50/10* (2016.02); *H02J 50/12* (2016.02); *H02J 50/402* (2020.01); *H02J 50/70* (2016.02); *H02J 50/80* (2016.02); *H04B 1/3833* (2013.01); *H04B 5/0031* (2013.01); *H04B 5/0037* (2013.01); *H04M 1/026* (2013.01); *H04M 1/0277* (2013.01); *H04M 1/03* (2013.01)

(58) Field of Classification Search
CPC ...... H02J 7/0042; H02J 7/0044; H02J 50/402; H01F 27/2804; H01F 27/02; H01F 27/2828; H01F 38/14; H01F 27/245; H04B 1/3833; H04B 5/0031; H04B 5/0037; H01Q 1/38; H01Q 7/06; H04M 1/03; H04M 1/026; H04M 1/0277
USPC ................. 320/107, 108, 114, 115; 307/104
See application file for complete search history.

(56) References Cited

U.S. PATENT DOCUMENTS

| | | |
|---|---|---|
| 8,905,317 B1 | 12/2014 | Hsu et al. |
| 8,922,162 B2 | 12/2014 | Park et al. |
| 9,413,191 B2 | 8/2016 | Kim et al. |
| 9,653,942 B2 | 5/2017 | Kim et al. |
| 10,284,023 B2 | 5/2019 | Kim et al. |
| 10,491,049 B2 | 11/2019 | Kim et al. |
| 11,018,531 B2 * | 5/2021 | Kim ................... H01F 27/2804 |
| 2008/0238799 A1 | 10/2008 | Tsushima |
| 2009/0058358 A1 | 3/2009 | Inoue et al. |
| 2010/0311327 A1 | 12/2010 | Hamada |
| 2011/0031928 A1 | 2/2011 | Soar |
| 2011/0050164 A1 | 3/2011 | Partovi et al. |
| 2011/0210619 A1 | 9/2011 | Beart et al. |
| 2011/0285347 A1 | 11/2011 | Chen |
| 2014/0306654 A1 | 10/2014 | Partovi |
| 2015/0123604 A1 | 5/2015 | Lee et al. |

FOREIGN PATENT DOCUMENTS

| | | |
|---|---|---|
| JP | 10-282232 | 10/1998 |
| JP | 2007325339 | 12/2007 |
| JP | 2008-027015 | 2/2008 |
| JP | 2010-287113 | 12/2010 |
| JP | 2011029799 | 2/2011 |
| JP | 2011072097 | 4/2011 |
| JP | 2011-103694 | 5/2011 |
| JP | 5013019 | 6/2012 |
| KR | 1020020035242 | 5/2002 |
| KR | 1020050087781 | 8/2005 |
| KR | 1020090010431 | 1/2009 |
| KR | 100928439 | 11/2009 |
| KR | 1020100037502 | 4/2010 |
| KR | 1020100067749 | 6/2010 |
| KR | 100971717 | 7/2010 |
| KR | 1020100132724 | 12/2010 |
| KR | 1020110033836 | 3/2011 |
| KR | 1020110040621 | 4/2011 |
| KR | 1020110048567 | 5/2011 |
| KR | 1020110103395 | 9/2011 |
| KR | 1020110115602 | 10/2011 |
| WO | 2002/037641 A1 | 5/2002 |
| WO | 2009014366 | 1/2009 |
| WO | 2011135722 | 3/2011 |

OTHER PUBLICATIONS

European Office Action for Application No. 13 735 991.5-1804 dated Nov. 3, 2017.
European Search Report—EP Application No. 13735991.5 dated Jun. 3, 2015.
International Preliminary Reporton Patentability—PCT/KR2013/000147 dated Jul. 15, 2014.
International Search Report—PCT/KR2013/000147 dated Apr. 26, 2013.
Japanese Office Action—JP Application No. 2014-545839 dated Mar. 10, 2015.
Written Opinion—PCT/KR2013/000147 dated Apr. 26, 2013.

* cited by examiner (A)

(B)

(A)

(B)

(A)

(B)

(A)

(B)

RECEIVER FOR WIRELESS CHARGING SYSTEM OF A PORTABLE COMMUNICATION DEVICE

CROSS-REFERENCE TO RELATED APPLICATIONS

This application is a continuation application of prior application Ser. No. 16/919,817, filed on Jul. 2, 2020, which is a continuation of prior application Ser. No. 16/588,092, filed on Sep. 30, 2019 and issued as U.S. Pat. No. 10,944,298 on Mar. 9, 2021, which is a continuation of U.S. patent application Ser. No. 16/364,371, filed on Mar. 26, 2019 and issued as U.S. Pat. No. 10,491,049 on Nov. 26, 2019, which is a continuation of U.S. patent application Ser. No. 16/036,082, filed on Jul. 16, 2018 and issued as U.S. Pat. No. 10,284,023 on May 7, 2019, which is a continuation of U.S. patent application Ser. No. 15/478,582, filed on Apr. 4, 2017 and issued as U.S. Pat. No. 10,050,478 on Aug. 14, 2018, which is a continuation of U.S. patent application Ser. No. 15/201,915, filed on Jul. 5, 2016 and issued as U.S. Pat. No. 9,653,942 on May 16, 2017, which is a continuation of U.S. patent application Ser. No. 14/369,350, filed on Jun. 27, 2014 and issued as U.S. Pat. No. 9,413,191 on Aug. 9, 2016, which claims priority to PCT/KR2013/000147, filed on Jan. 9, 2013, which claims priority to Korean Patent Application Nos. 10-2012-0086193, filed on Aug. 7, 2012, 10-2012-0048052, filed on May 7, 2012, and 10-2012-0002291, filed on Jan. 9, 2012, and all the benefits accruing therefrom under 35 U.S.C. § 119, the contents of which are incorporated by reference herein in its entirety.

BACKGROUND OF THE INVENTION

Field of the Invention

The present invention relates to a wireless charger, and more specifically, to a receiver for a wireless charging system, which provides a new design structure for efficiently receiving power wirelessly transmitted from the wireless charger.

Background of the Related Art

Techniques of providing wireless transmission and reception units in an electronic device and accomplishing wirelessly charge are under development. Mobile communication terminals are developed in a variety of forms recently, and therefore, there are charging jacks as diverse as various forms of power chargers. Although a problem of compatibility between the chargers arises accordingly, since the charging jacks are standardized to a 24-pin charging jack, the problem of compatibility between the chargers has been solved for users.

However, since charging is still accomplished through a long cable wired between a charger and a device, users considerably suffer from troubles and inconvenience due to the limitation on distance. In addition, when a plurality of terminals is charged using one charger, there is a problem in that the users can be troubled due to manual attachment and detachment of the charger and the terminal jack or the terminal can be damaged due to abrasion or damages of a connection part.

However, since the specification and shape of a terminal are different among devices in a connection terminal type, users suffer from difficulties of repeatedly purchasing a new charging device, and this method generates a new problem of discarding previously used chargers when a new device is purchased.

In addition, a non-contact type magnetic induction method, i.e., a wireless charging method, has been devised to solve the above problems. The non-contact type charging method is a method of providing current of a charging parent, i.e., energy, to the battery of a portable electronic device through inductive coupling, by configuring a primary circuit operating at a high frequency in the charging parent and configuring a secondary circuit at the battery side, i.e., in a portable electronic device or the battery. The non-contact type charging method using the inductive coupling is already used in some application fields (e.g., an electric toothbrush, an electric shaver and the like).

However, when the non-contact type charging method is desired to be applied to a portable electronic device, such as a cellular phone, a portable MP3 player, a CD player, an MD player, a cassette tape player, a notebook computer, a PDA or the like, variation of charging efficiency generated according to the position of placing the portable electronic device or the battery should be improved, in addition to the required condition of reducing the volume and weight which will be added to the battery.

However, when the non-contact type charging method is applied to a cellular phone or a smart phone, needless to say that the variation should be improved, there is a problem in that since various types of wireless chargers are released in a predetermined method, the wireless chargers cannot charge a battery if the charging methods are different.

Furthermore, the non-contact type charging method provides only one coil, and a design specification between coils is not determined, and, in addition, an accurate structure of placing a coil in a terminal is not described.

That is, in prior art 1 (Korean Patent Registration No. 10-0928439), a lower core is provided to be placed between a first upper core (coil) and a second upper core, and a control unit determines which of the lower core, the first upper core and the second upper core receives a signal transmitted from a non-contact point power reception apparatus and controls transmission of a power signal through a corresponding core in correspondence to a result of the determination. However, a coil (antenna) having a composite function is not presented, and an optimal design condition or structure is not presented.

In addition, in prior art 2 (Korean Patent Registration No. 10-0971714), the inductive pattern core of the primary core unit is provided with a lower core layer having a plurality of cores formed on the top of a PCB base and an upper core layer having a plurality of cores formed on the top of a gap panel on the lower core layer, and although the lower core layer and the upper core layer are positioned to intersect with each other to be provided as multiple layers, a structure of a core (antenna) having a composite function is not presented, and an optimum design condition is not specifically presented.

In addition, although prior art 3 (Korean Patent Registration No. 10-1001262) provides a rechargeable cellular phone case including a support for detachably resting a portable terminal; and a charging module provided in the support to accomplish wireless charge when the portable terminal is rested on the support as the magnetic fields generated by the power supplied from outside are transferred to the portable terminal side by electromagnetic induction, it also does not present a structure of a core (antenna) having a composite function and does not specifically present an optimum design condition.

Accordingly, it is necessary to develop a wireless charging method having both a composite function and an optimum design condition.

DISCLOSURE

Technical Problem

Therefore, the present invention has been made in view of the above problems, and it is an object of the present invention to provide a design structure of a wireless power reception unit in order to effectively receive power transmitted from a wireless power transmission unit in a wireless charging system, and specifically, to provide a new shape of a coil and a structure of selecting and designing the coil.

Technical Solution

To accomplish the above object, according to one aspect of the present invention, in a receiver for a wireless charging system capable of receiving power energy using non-contact type magnetic induction, when the receiver for a wireless charging system is provided with a coil 52 capable of receiving the power energy and a part for generating a predetermined output power from the power energy received by the coil, the receiver for a wireless charging system is provided in a portable terminal 60, and an NFC coil 51 is further provided outside of the coil, and a ferrite sheet 59 is further provided at the coil and the NFC coil.

The NFC coil and the coil are spaced apart from each other, and a spaced distance is between 1 to 10 mm. The part includes a control unit 10 for controlling reception of wireless power, and when the portable terminal is provided with a main CPU 110 for controlling the portable terminal, the main CPU controls the wireless charge receiver.

When a battery is embedded in the portable terminal, the coil is provided on a surface of the battery embedded in the portable terminal, and a part 55a of the wireless charge receiver is provided on a side surface of the battery.

In addition, a PCB substrate 55 provided with the part and a substrate 50 provided with the coil are separated and bent in two pieces, and the part is provided on the side surface of the battery and the substrate 50 of the coil is provided on the surface of the battery, and the substrate 55 provided with the part and the substrate 50 provided with the coil are connected to each other using a flexible connection line 57.

On the other hand, when the part 55a is provided on the side surface of the battery, the part exists between the substrate 50 and the side surface of the battery, and the coil is provided in a lower case 61 of the portable terminal.

In addition, the coil is provided in the lower case of the portable terminal in a method of attaching the coil to the lower case 61 and attaching a film 62 thereon, and a circuit path of data received through the NFC coil and a circuit path for transferring the power energy received through a wireless power reception coil are separated from each other, and the two coils are separated in terms of circuit.

At this point, if wireless power energy is received through the coil, power of the NFC coil is turned off.

In another embodiment of the present invention, a ferrite sheet provided at the coil and the NFC coil is integrated in one piece. Then, a space is constructed by forming a groove on the ferrite sheet, and the coil and the NFC coil are provided in the space, and the coil and the NFC coil are provided on a surface of the ferrite sheet, and the ferrite sheet is also provided between the coil and the NFC coil.

In addition, the ferrite sheet is made of manganese or zinc, and the ferrite sheet is made of manganese oxide, zinc oxide or iron oxide, and whether or not a wireless charger and an NFC are used is displayed on a display screen of the portable terminal.

Meanwhile, the coil is two or more overlapped coils, and when the coil is provided on a surface of a battery, an area where the coil is provided is 40 to 90% of an area of the surface of the battery, and when the coil is provided on a surface of a case, an area where the coil is provided is 40 to 90% of an area of the surface of the case.

In addition, the ferrite sheet and the coil are manufactured as a film and attached to a battery or a case, and the coil is provided on an inner surface of a case and attached using a protection film or the coil is provided on an outer surface of a case and attached using a protection film.

In addition, the coil is provided inside a case, the coil is provided on a surface of a battery and a protection film is provided on the coil, and two or more types of coils respectively having a different characteristic may be provided, and an NFC module for controlling the NFC coil and an MCU for controlling the coil are separately provided, and a main CPU of the portable terminal controls the NFC module and the MCU or the main CPU of the portable terminal directly controls the NFC coil and the coil.

Advantageous Effects

According to aspects of the present invention, the shape of a coil in the reception unit is effectively designed in a wireless power system and, additionally, a structure capable of enhancing efficiency of magnetic fields of the reception unit is provided, such that a reception unit for a wireless power system may selectively receive wireless power according to the state of a wireless power transmission unit and obtain an effect of enhancing reception efficiency.

BEST MODE FOR CARRYING OUT INVENTION

A design structure of a wireless power transmission and reception unit is provided in order to effectively transmit and receive wireless power in a wireless charging system, and a feasible structure for enhancing the efficiency of transmitting and receiving wireless power energy is provided.

DETAILED DESCRIPTION OF THE PREFERRED EMBODIMENT

Hereafter, a design structure of a reception unit for a wireless charging system according to an embodiment of the present invention will be described in detail.

Embodiment 1

Figure 1:
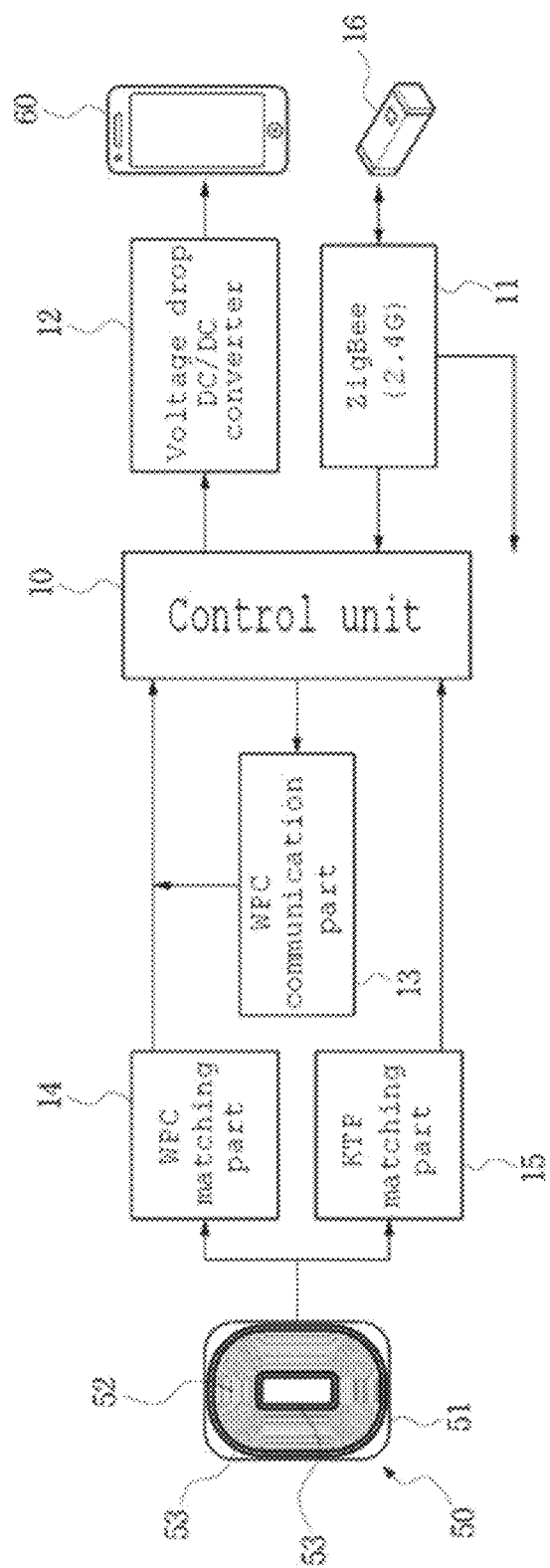
FIG. 1 is a block diagram showing a reception unit of a wireless charging system of the present invention.

FIG. 1 is a block diagram showing a reception unit of a wireless charging system of the present invention.

Generally, a wireless charging system is configured of a transmission unit for transmitting power energy and a reception unit for receiving the power energy, and the transmission unit periodically drives a sensor to sense a predetermined signal and determines whether or not a charge request signal is sensed. When a charge request signal is sensed, a power transmission unit of the transmission unit is turned on. Then, the transmission unit confirms battery voltage of the receiving side through a signal of the reception unit, and if a charge enable state is confirmed, transmission of power is performed.

At this point, if the wireless charging system enters into the above state, the reception unit receives the power energy, and power is charged into the battery of the reception unit. That is, the block diagram of FIG. 1 shows an effective design structure of the reception unit provided to effectively construct such a general wireless charging system.

There is provided an antenna loop coil substrate 50 for primarily receiving wireless power, and multiple coils are especially provided in the present invention. That is, a wireless power consortium (WPC) type coil 52, a KTP (kthepower) type coil 53 and an antenna coil 51 used for near field communication (NFC), which is a short range communication, are provided on the loop coil substrate 50 of the present invention. In addition, the coils 51, 52 and 53 are provided on one substrate.

At this point, as shown in the figure, the antenna coil 51 used for NFC is provided at the outermost side.

In addition, in the above descriptions, there are provided a ZigBee 11 which is a communication module for transmitting and receiving signals with the transmission and reception unit, a control unit 10 for controlling each of signals and parts using a predetermined program, and a converter 12 for adjusting voltage or power to be finally fit for the voltage of a battery of a cellular phone 60 or the like. At this point, the converter 12 may perform a function of increasing or decreasing the voltage according to a situation and may also increase or decrease the energy.

In addition, another characteristic of the present invention is providing a WPC matching part 14 and a KTP matching part 15. That is, in the present invention, there are a WPC type coil 52 and a KTP type coil 53, and the matching part 14 or 15 functions to receive power energy by selecting either of the two types.

That is, since inductance of each coil is different, the matching part 14 or 15 matches inductance of the coil to the communication part.

Figure 2:
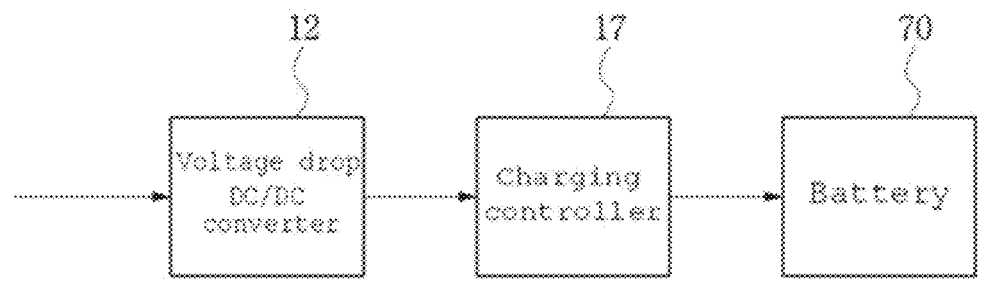
FIG. 2 is a view showing another embodiment of a charging method.

FIG. 2 is a view showing another embodiment of a charging method.

A charging controller 17 may be provided between the converter 12 and the battery 70 in order to directly charge the battery 70. At this point, the charging controller may be provided in the form of a charging integrated circuit (IC). It may be referred to as a so-called charging management controller, and it is apparent that a variety of methods such as a pulse method, a linear method, a switch method and the like may be applied.

Figure 3:
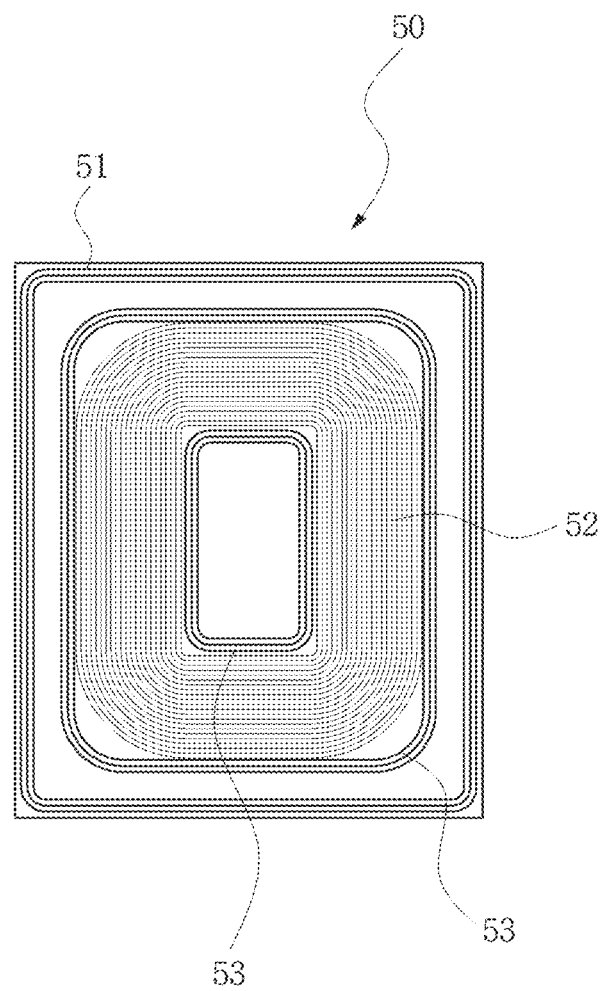
FIGS. 3 and 4 are views showing coils of the present invention in detail.
Figure 4:
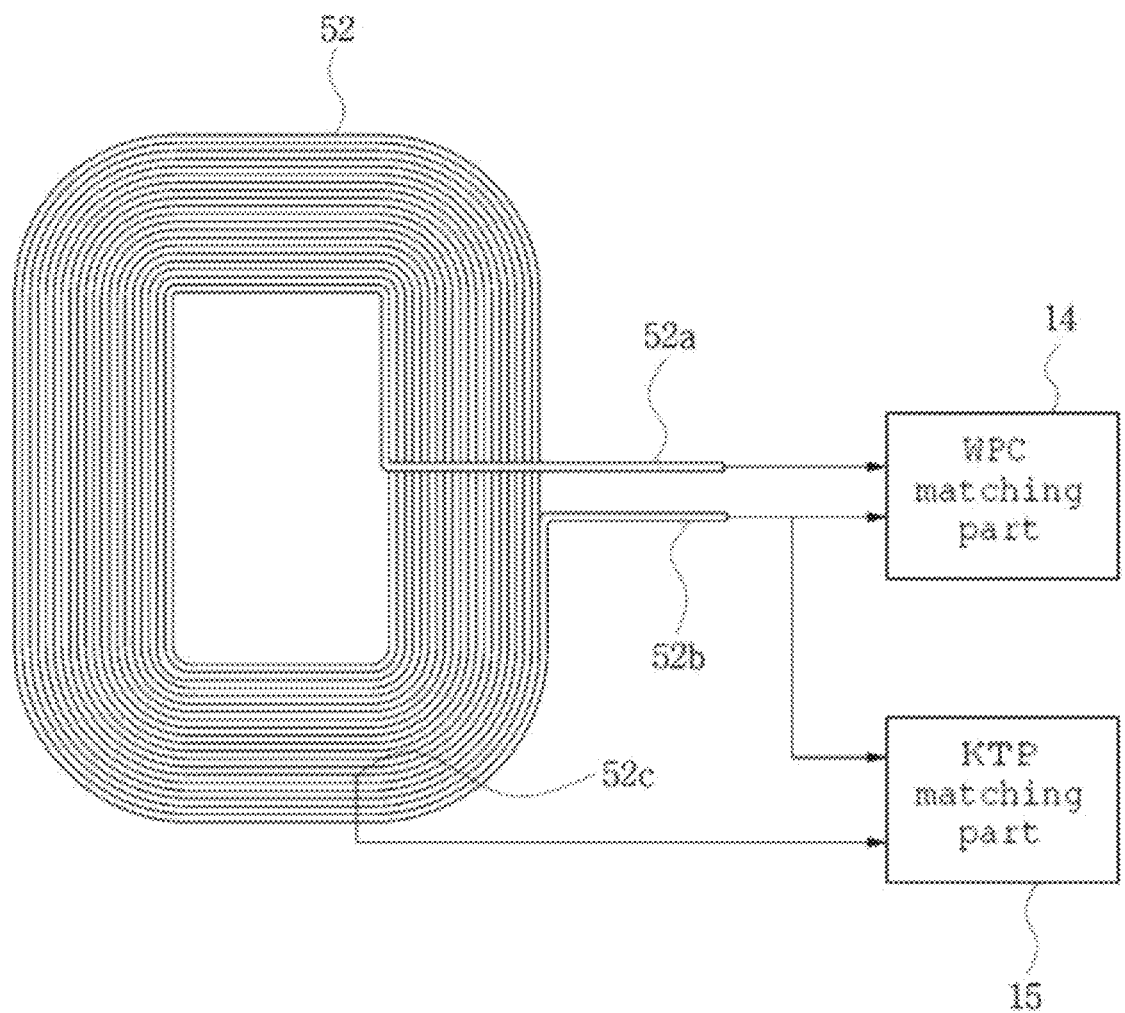

FIGS. 3 and 4 are views showing coils of the present invention in detail.

Although the substrate is not shown in the figure, it is apparent that multiple coils are provided on a flexible resin substrate or a general substrate (e.g., a plastic or metallic substrate). In addition, as shown in FIG. 3, the NFC coil 51 is provided at the outermost side to be the largest coil, and the WPC coil 52 and the KTP coil 53 are provided inside thereof.

At this point, the KTP coil 53 is formed of two coils (an inner coil and an outer coil), and the WPC coil 52 is formed between the two coils. In addition, like the shapes of the coils shown in the figure, the WPC coil 52 is provided in the form of a spiral coil by directly winding a coil of an electrical wire style such as copper, and the KTP coil 53 and the NFC coil are provided in the form of a thin film (a coil of a thin film style formed through an etching process after deposition or print coating) on the substrate.

Accordingly, a substrate in the present invention may be a base substrate (a PCB or a substrate of metal or resin) for forming a loop coil by coating or a substrate only for supporting a loop coil. At this point, it is apparent that the substrate for supporting a loop coil may be a substrate of simple meaning for fixing a spiral coil on a plate (a hard or flexible plate made of metal or resin). That is, it may be a form of attaching a spiral coil on a substrate using a tape or an adhesive.

Meanwhile, in still another embodiment of the present invention, there is provided a method of providing a coil in another part.

FIG. 4 is a view showing still another embodiment of different kinds of coils.

For example, if an inductance value of the KTP type coil is 3 $\mu$H and an inductance value of the WPC type coil is 9 $\mu$H, the number of turns of each corresponding coil will be different. Accordingly, as shown in the figure, the WPC coil is used by connecting lead wires 52a and 52b at both ends of the coil 52, and the KTP coil is used by connecting lead wires 52c and 52b at the middle and one end of the coil 52. In addition, the WPC lead wires 52a and 52b are connected to the WPC matching part 14, and the KTP lead wires 52b and 52c are connected to the KTP matching part 15.

Then, wireless power energy is received through the coil connected to a lead wire which is connected to a matching part selected by the control unit 10.

Figure 5:
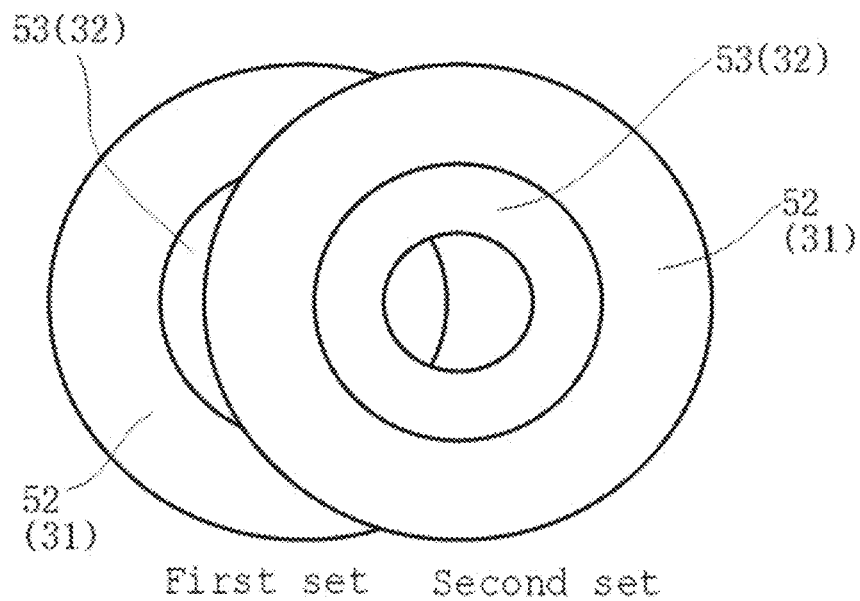
FIGS. 5 to 7 are views showing embodiments of arranging multiple coils.
Figure 6:
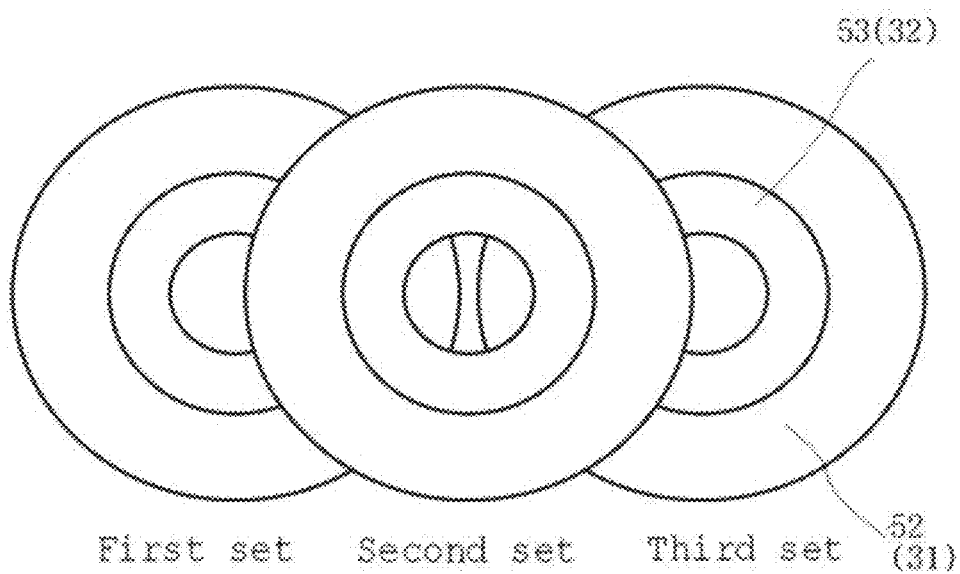
Figure 7:
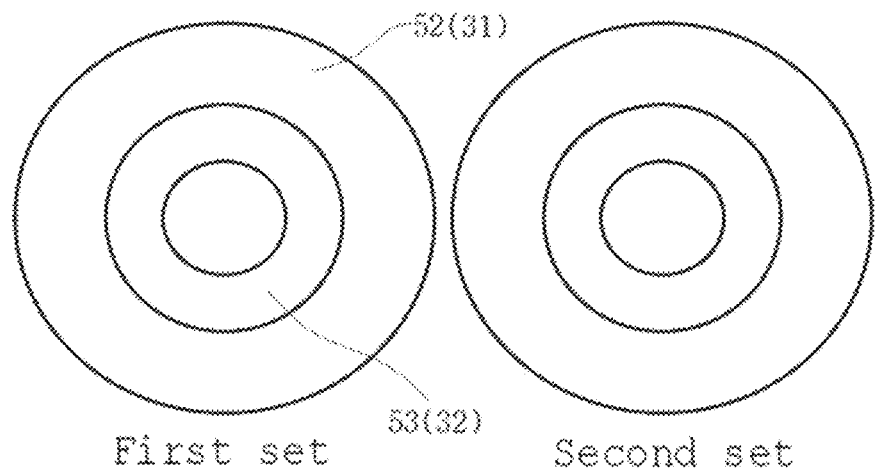

FIGS. 5 to 7 are views showing embodiments of arranging multiple coils.

FIG. 5 is a view of an embodiment showing a state of two overlapped coils. That is, in the wireless charging system, coils of different charging methods are provided in a coil set (e.g., if a B type charging coil is wound inside or outside of an A type charging coil or a lead wire is provided in the middle of a coil and a different charging method can be selected, these coils are referred to as a coil set).

In addition, it shows a case of overlapping two coil sets.

FIG. 6 is a view of an embodiment showing a case of overlapping three coil sets, and FIG. 7 is a view showing an embodiment of two or more coil sets that are not overlapped.

As shown in the figures, when multiple coils are provided regardless whether or not the coils are overlapped, the coils sets may be applied as a transmission unit coil or a reception unit coil.

Embodiment 2

Figure 8:
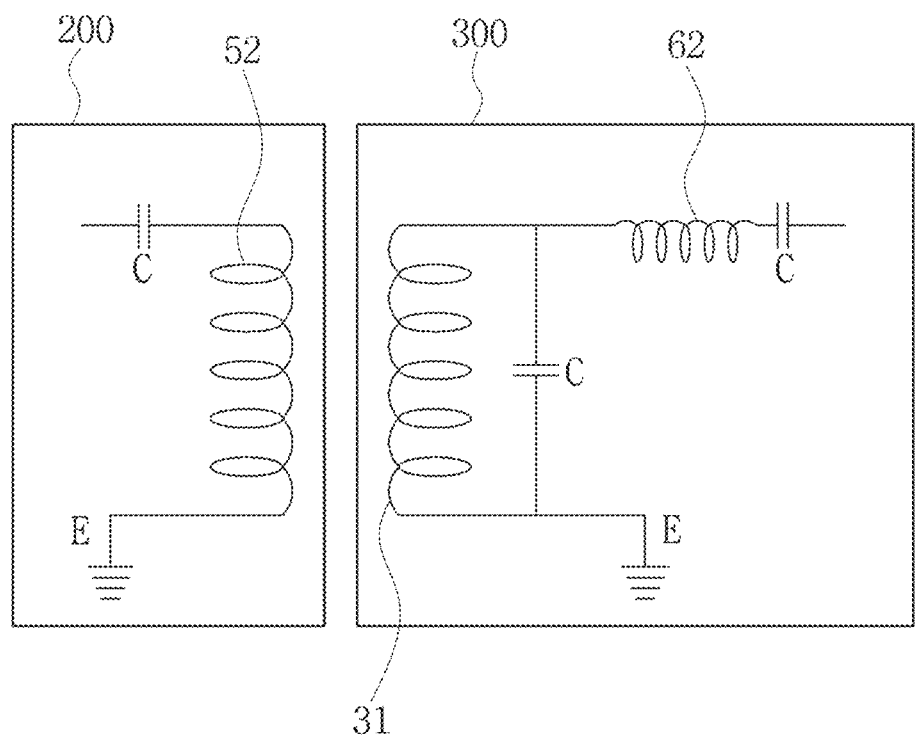
FIG. 8 is a view illustrating the principle of a wireless charger.

FIG. 8 is a view illustrating the principle of a wireless charger.

FIG. 8 shows a general structure of a wireless charger for supplying power energy. First, a reception unit 200 has a structure of connecting the antenna loop coils 52 and 53 to a condenser C in series, and a transmission unit 300 also has a structure of connecting an antenna loop coil 31 to a condenser C in parallel. The only difference is that the transmission unit 300 is further provided with a resonance filter, and the resonance filter is configured as a structure of connecting the coil 62 and the condenser C in series. At this point, it is apparent that the series and parallel connections of the loop coils and the condensers can be changed.

A method generally used in a wireless charger is a wireless power consortium (WPC) method, and the WPC method generally has following conditions in order to transfer wireless power energy.

"Voltage: 7 to 15V (in the case of the reception unit), Frequency: 100 to 200 kHz, Current: 5V (0.7 A), Power: 3.5 W, Inductance value of coil: 8 to 12 micro Henry"

Meanwhile, the coil and the condenser have a structure of being connected in series. When the wireless power energy is transferred, the antenna loop coils 52 and 53 are used as a medium, and the antenna loop coils 52 are 53 have a structure of being connected to the condenser in series.

Meanwhile, the KTP method developed by the company of the inventors has the following characteristics.

"Voltage: 7 to 24V (in the case of the reception unit), Frequency: 1 to 6.78 kHz, Current: 5V (1 A), Power: 5 W, Inductance value of coil: 600 nH (nano Henry) to 2 micro Henry"

At this point, it does not mean that the voltage and current values shown above are exactly matched to the numbers shown above, and apparently, they show only a range.

Anyway, the biggest difference between the WPC method and the KTP method is a difference in an inductance value and in a frequency value of the coil. First, a reference value of the frequency difference may be set to 1 MHz. That is, the WPC method has a low frequency lower than 1 MHz, and the KTP method has a high frequency higher than 1 MHz.

However, as actually used frequencies, the WPC method uses a frequency of 100 to 200 KHz, and the KTP method uses a high frequency higher than 6 to 8 MHz.

In addition, as an inductance value of the coil, the WPC method uses "8 to 12 micro Henry", and the KTP method uses "600 nano Henry to 2 micro Henry".

The KTP method having the above characteristics is highly advantageous. For example, since even a part for generating a frequency uses a high frequency, the part can be miniaturized (a high frequency generally reduces the size of a part), and by reducing the inductance value of the coil, a coil formed by printing on a PCB substrate (or a resin substrate) may be used instead of a spiral coil.

Since coils are formed on a substrate, it is advantageous in mass production and has an effect of reducing a unit price. In addition, the number of turns of a coil (the number of windings) exceeds 50 times in the WPC method, but the KTP method may reduce the number of turns to be less than 50.

Meanwhile, the number of turns is a number mentioned based on a criterion applied to a cellular phone. It is a number generally calculated for a general cellular phone having an area less than 100 square centimeters in maximum.

Embodiment 3

Figure 9:
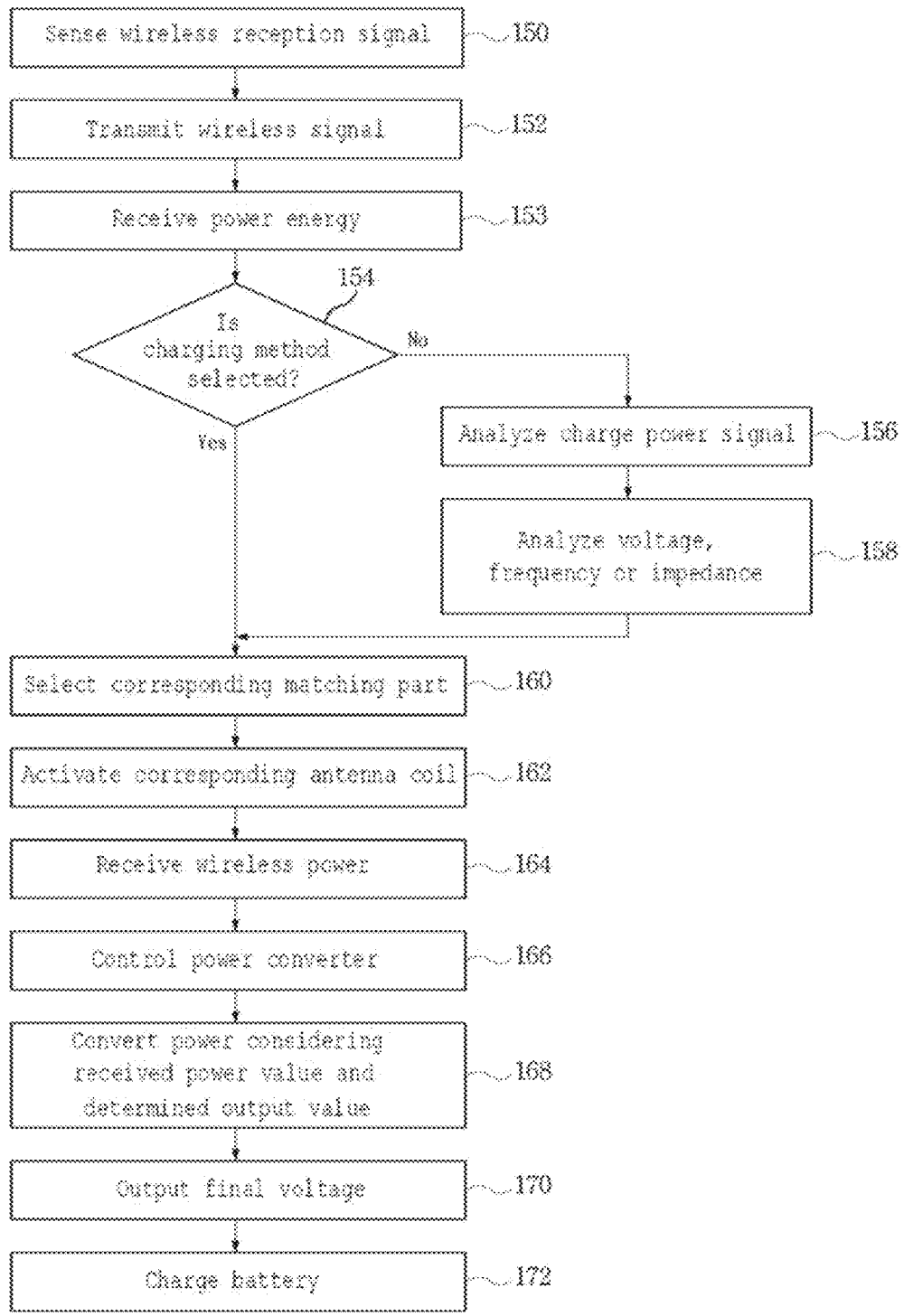
FIGS. 9 and 10 are flowcharts illustrating the present invention.
Figure 10:
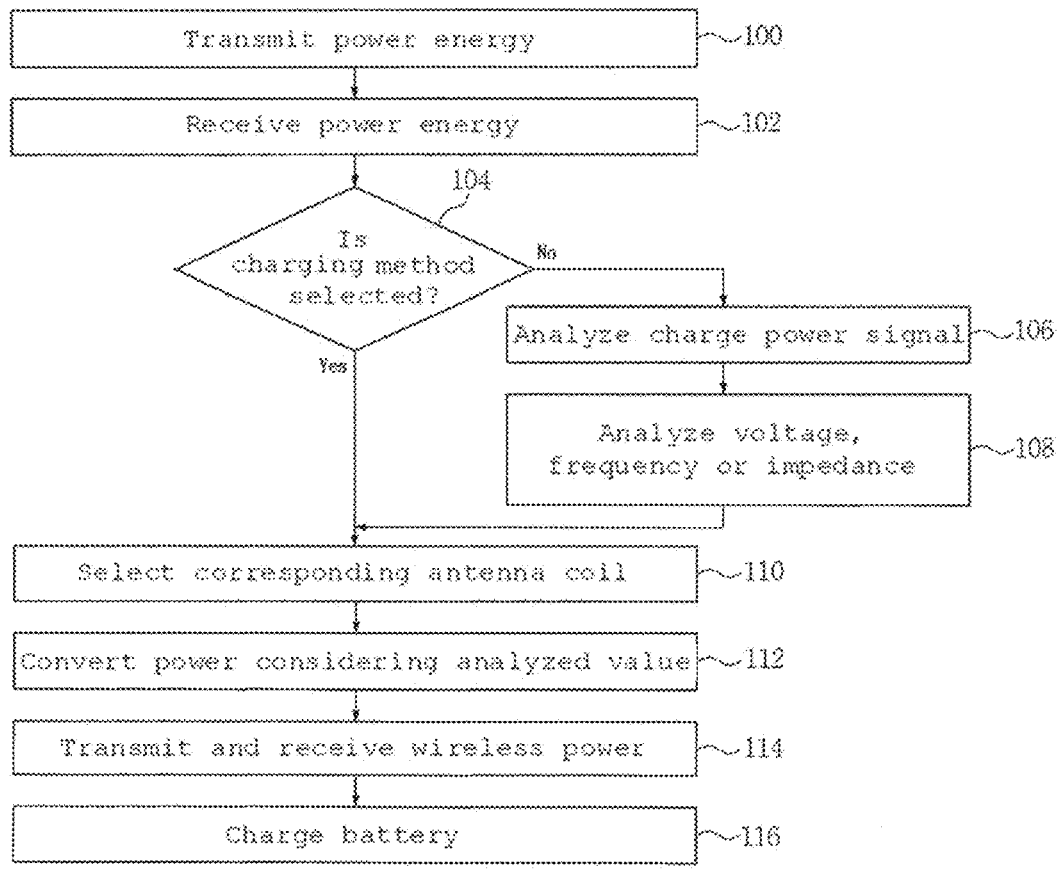

FIGS. 9 and 10 are flowcharts illustrating the present invention.

First, FIG. 9 will be described. A wireless charging system is configured of a transmission unit for transmitting power energy and a reception unit for receiving the power energy. If the reception unit transmits a signal requesting transmission of power energy to the transmission unit, the transmission unit which periodically drives a sensor to receive a predetermined signal receives a charge request signal and transmits a charging signal to the reception unit. That is, the signal received by the reception unit through a near field communication module 16 in this general procedure is transmitted to the control unit 10, and the control unit 10 exchanges signals with the transmission unit in a predetermined method (steps 150 and 152).

Then, after exchanging the communication signals with each other in a predetermined method, the reception unit receives power energy (step 153). At this point, the present invention provides a design structure capable of receiving power energy of different methods.

That is, if the charging method of the transmission unit can be distinguished based on the near field communication signal, a corresponding matching part is selected and activated, and a coil connected to the patching part is activated as a result (steps 154 and 160).

As a result, the power energy is received through an antenna loop coil connected to the matching part selected by the control unit 10.

That is, the near field communication signal may include a signal for identifying a charging method, and if the charging method is identified, a corresponding matching part can be immediately selected. Here, selecting a corresponding matching part is the same as the description of the block diagram of FIG. 1. (It means that the process may directly proceed from step 154 to step 160 in FIG. 6.)

Meanwhile, if a charging method cannot be selected through the near field communication signal, the charging method can be selected by analyzing a value of magnitude of the wireless power energy transmitted from the transmission unit (steps 156 and 158). As is described in FIG. 8, the WPC method and the KTP method respectively have a different voltage, frequency, impedance or inductance value, and a charging method is identified by analyzing these values. In addition, the charging method is identified by the control unit 10 in a predetermined way. Then, if the charging method is identified, a corresponding matching part is selected (step 160).

The reason why the control unit 10 may identify a charging method is that the characteristic values of each method are previously stored in the control unit 10 or memory (although it is not separately mentioned in the present invention, it is apparent that a memory device is provided to perform a predetermined algorithm), and a charging method is identified based on the stored values.

If a corresponding matching part is selected and activated, a corresponding coil is also activated, and the wireless power energy is received (steps 162 and 164). If the wireless power energy is received through the antenna coil 52 or 53, the converter 12 is controlled by the control unit 10 to generate 5V voltage that can be finally charged in the battery, and thus the battery is charged (step 166).

That is, the control unit 10 determines a conversion ratio of the converter based on a selected method, and the converter converts and finally outputs a voltage or power in proportion to the ratio (step 168).

At this point, the flowchart of FIG. 9 provides a method of receiving power energy transmitted in two methods by the transmission unit in the wireless charging system. That is, if the power energy is transmitted in a method among the two determined methods, the reception unit selects a method capable of receiving the transmitted power energy and receives the power energy.

However, when the reception unit selects a method capable of receiving the transmitted power energy, it is not that the method should be selected only from the two methods. That is, if a method can be identified and selected based on the inductance, impedance, voltage, frequency, near field communication symbol or the like of a coil, and the power energy can be transmitted by selecting one of three or more power energy transmission methods, the reception unit may select a reception method and receive the power energy in the end.

For example, there may be other methods in addition to the WPC method and the KTP method, and the transmission unit may transmit the power energy in a method other than the two methods. Even in this case, a method of transmitting the power energy is also determined based on the inductance, impedance, voltage, frequency, communication symbol or the like of a coil, the reception unit may select a corresponding method and receive the power energy.

FIG. 10 is a view showing another embodiment of selecting a charging method by analyzing a state.

If wireless charging is started, power energy is transmitted and received (steps 100 and 102).

If a charging method of a switch or menu type is manually selected, a corresponding antenna coil may be selected (steps 104 and 110) (since a general method may be used as a selection method, a separate description of the manual selection method will be omitted in the present invention).

If a charging method is automatically selected, the charging signal of the reception coil 52 or 51 is analyzed. The voltage, frequency or impedance may be analyzed. In addition, a corresponding coil is selected according to the analyzed value (steps 104 to 110).

In addition, the coil is allowed to have a value corresponding to the analyzed voltage, frequency or impedance value (step 112). For example, if a charging method is selected by analyzing the frequency value, the coil of the reception unit has a frequency value of the selected method.

If a charging method is selected as described above, transmission and reception of wireless power energy occurs, and the battery is charged.

Embodiment 4

FIGS. 11 to 17 are views showing embodiments describing a one chip construction method and the configurations of block diagrams.

Figure 11:
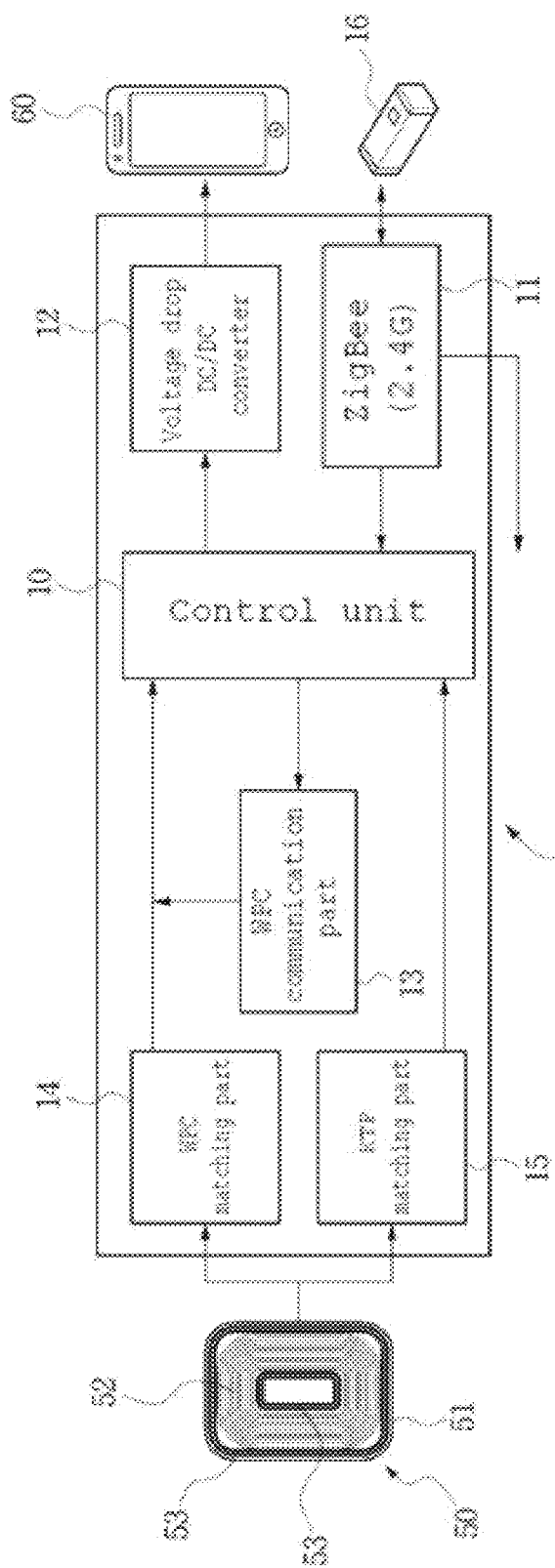
FIGS. 11 to 17 are views showing embodiments describing a one chip construction method and the configurations of block diagrams.

Constructing parts as one chip may be an important means to simplify the parts and reduce the manufacturing cost, and FIG. 11 is a view showing the parts which can be constructed as one chip in one block 100.

That is, a control unit 10, a communication module (ZigBee), a converter 12, matching parts 14 and 15 and a communication part 13 may be constructed in one chip to be configured as one part.

Meanwhile, each of the parts may be configured so as to receive wireless power energy while a battery is embedded in a cellular phone or an electronic device when the wireless power energy is received. In this case, a part of the cellular phone or a main CPU 110 of the electronic device may function as the control unit 10 of the reception unit in order to reduce the cost of the parts.

Figure 12:
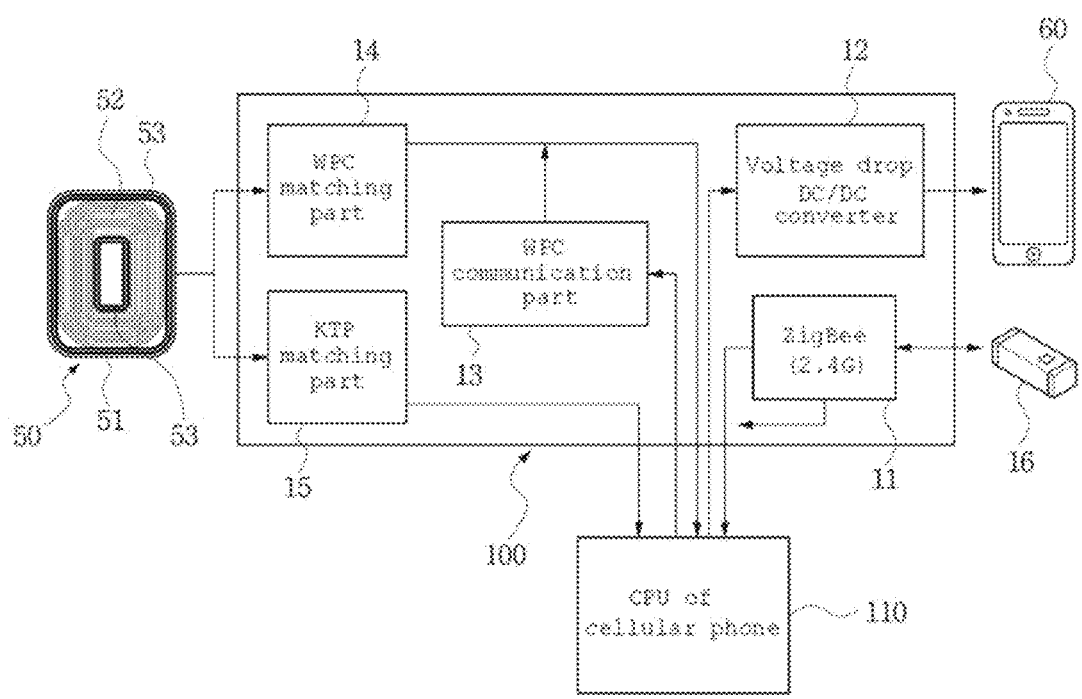

In addition, FIG. 12 is a view showing an embodiment of this case. At this point, in the case where the parts of the reception units are constructed as one chip, the communication module (ZigBee), the converter 12, the matching parts 14 and 15 and the communication part except the control unit 10 may be constructed in one chip to be configured as one part.

Figure 13:
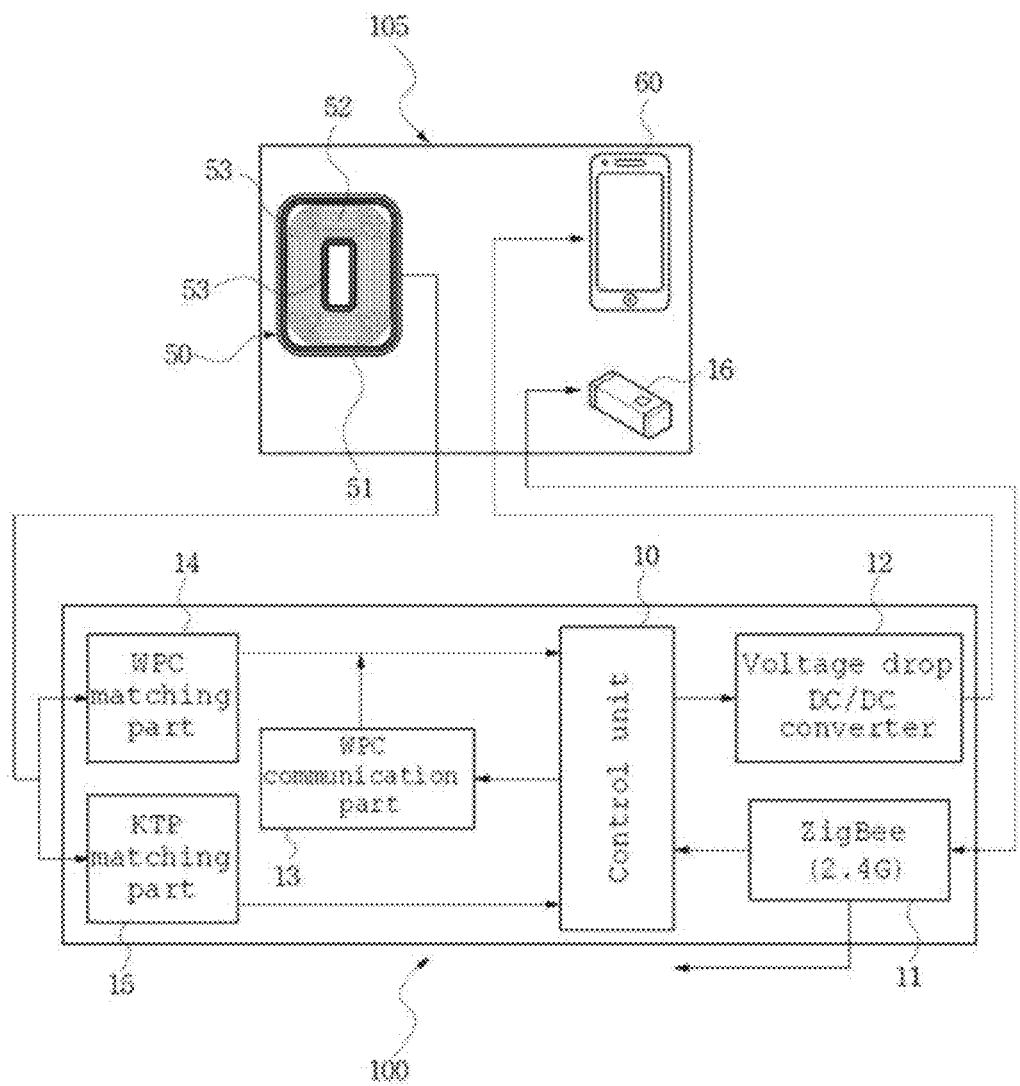
Figure 14:
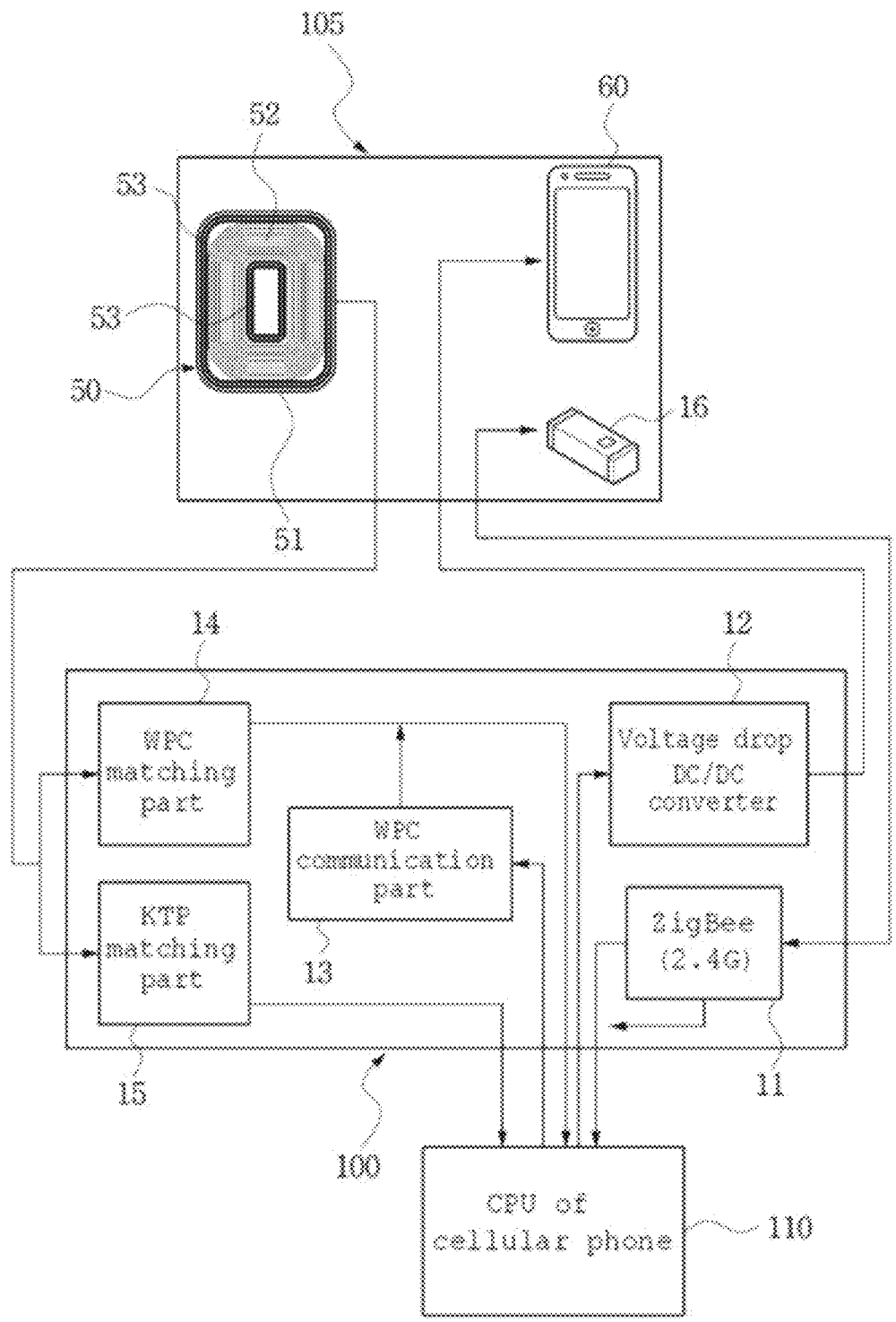

In addition, FIG. 13 is a view showing an embodiment of minimizing the parts of the reception unit by mounting all the parts other than the antenna loop coil 50 and the antenna chip 6 in a cellular phone or an electronic device. FIG. 14 is a view showing a case where the main CPU 110 of the cellular phone or the electronic device performs the function of the control unit 10 of the reception unit.

In the present invention, constructing parts as one part or one chip may mean integration of the parts. It means that the parts may be configured as an integrated circuit (IC) through the integration or manufactured as one part through micro electro mechanical systems (MEMS).

Figure 15:
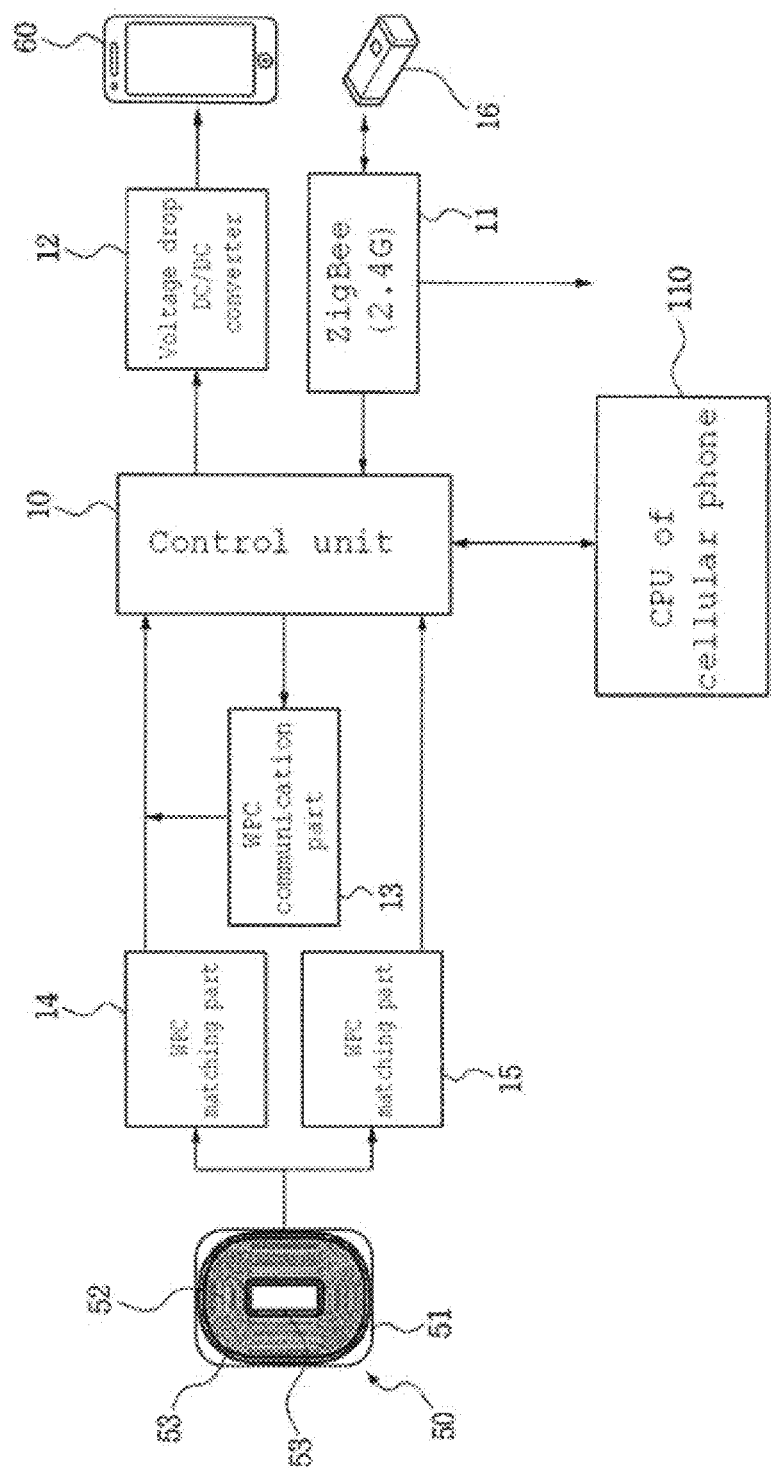
Figure 16:
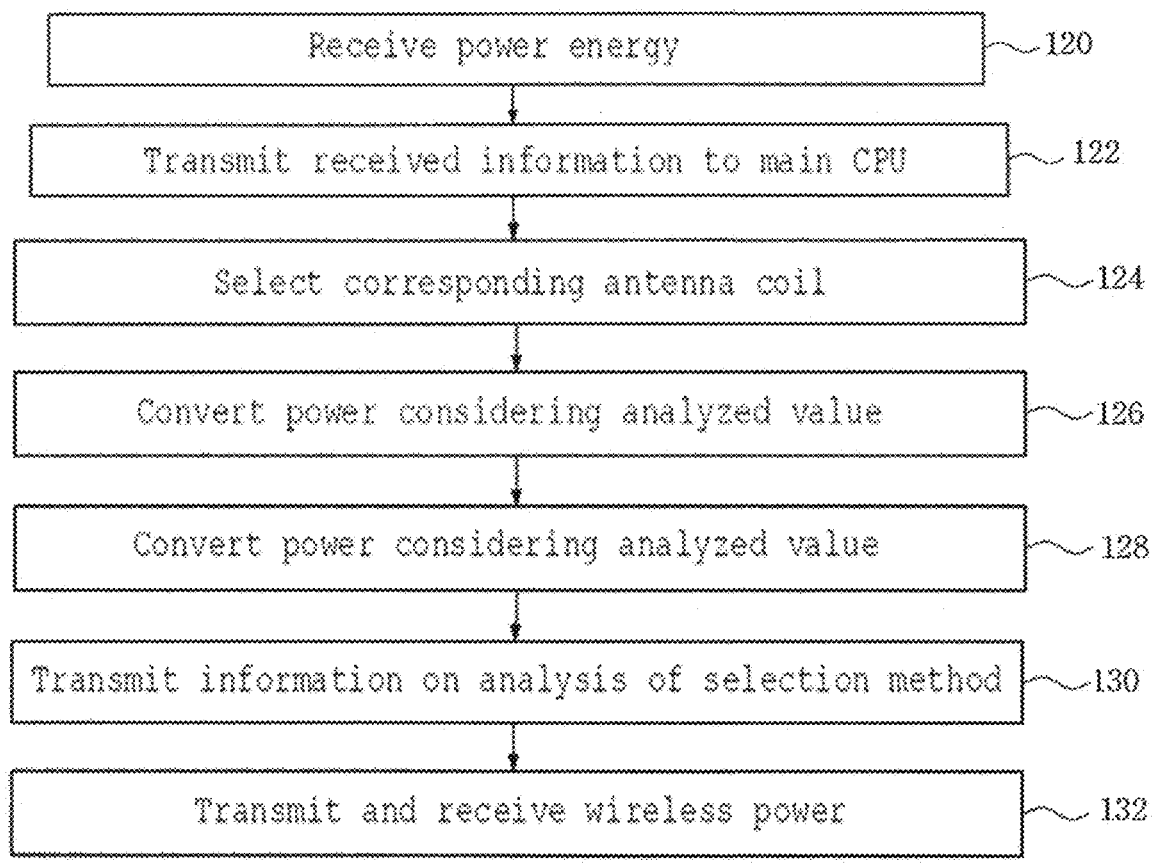
Figure 17:
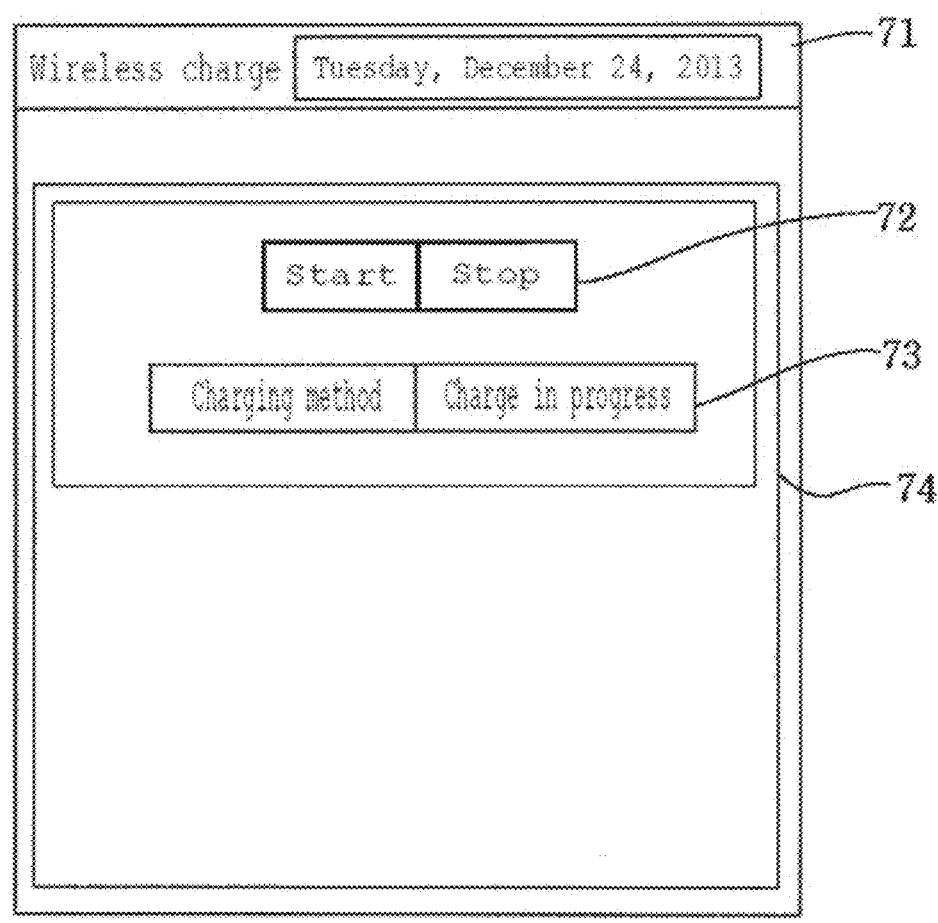

FIGS. 15 to 17 are views of still another embodiment showing a cellular phone control unit (a main CPU) 110 which controls a wireless charger.

FIG. 15 is a view showing an embodiment of a case in which a control unit 10 for controlling the wireless charger is provided and a central processing unit (main CPU) 110 of a cellular phone controls the control unit 10.

FIG. 16 is a view showing a block diagram of an embodiment in which the cellular phone control unit 110 and the wireless charger control unit 10 exchange information with each other.

If the wireless charger control unit 10 receives power energy, it transmits a receiving state to the cellular phone control unit 110 (steps 120 and 122). Then, an antenna coil appropriate to a charging method is selected, and voltage or power is converted considering an analysis value (refer to the above descriptions) (step 128).

Then, information on the selection method is also transmitted to the cellular phone control unit (step 130).

At this point, step 122 does not necessarily need to precede step 124. It may follow step 124 or 128.

FIG. 17 is a view showing an embodiment of a method of controlling wireless charge through a screen of a cellular phone.

If wireless charge is selected at a cellular phone (or a screen of a portable terminal), a screen 74 of the embodiment described above may be displayed, and a date 71 is displayed and a charge history may be stored. In addition, start and stop 72 of wireless charge may be selected, and a charging method 73 may be selected and displayed.

There is provided a reception unit for a wireless charging system, in which whether or not a wireless charger and an NFC are used is displayed on the display screen of a portable terminal.

Meanwhile, it is apparent that the control as shown in FIG. 17 may be applied to all the cases of the embodiments mentioned in the above figures.

Embodiment 5

FIGS. 18 to 23 are views showing embodiments of providing a reception unit on the surface of a battery.

Figure 18:
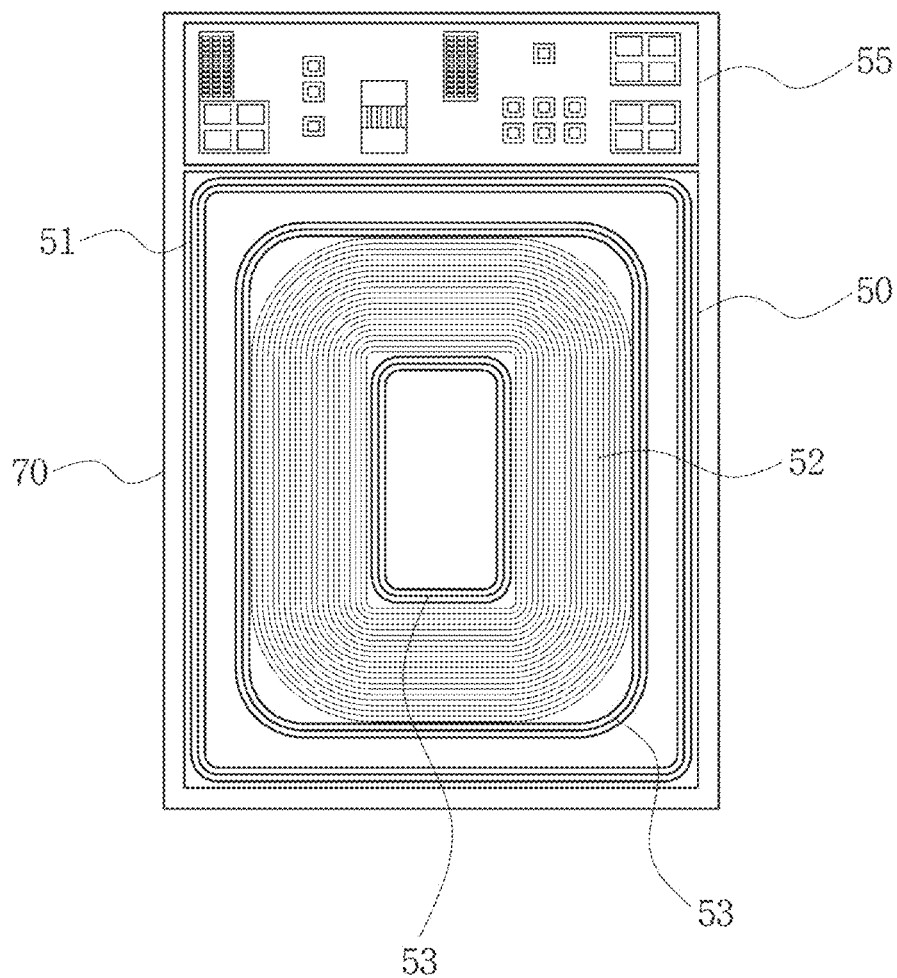
FIGS. 18 to 23 are views showing embodiments of providing a reception unit on the surface of a battery.

FIG. 18 is a view showing an antenna loop coil 50 and a part unit 55 of the reception unit mounted on the surface of a battery 70, and it has a structure in which the area of the antenna loop coil 50 and the part unit 55 of the reception unit is not wider than the surface of the battery. In addition, the part unit 55 is a view showing parts of the reception unit provided on one substrate or on a substrate of the same layer and mounted on the surface of the battery.

Figure 19:
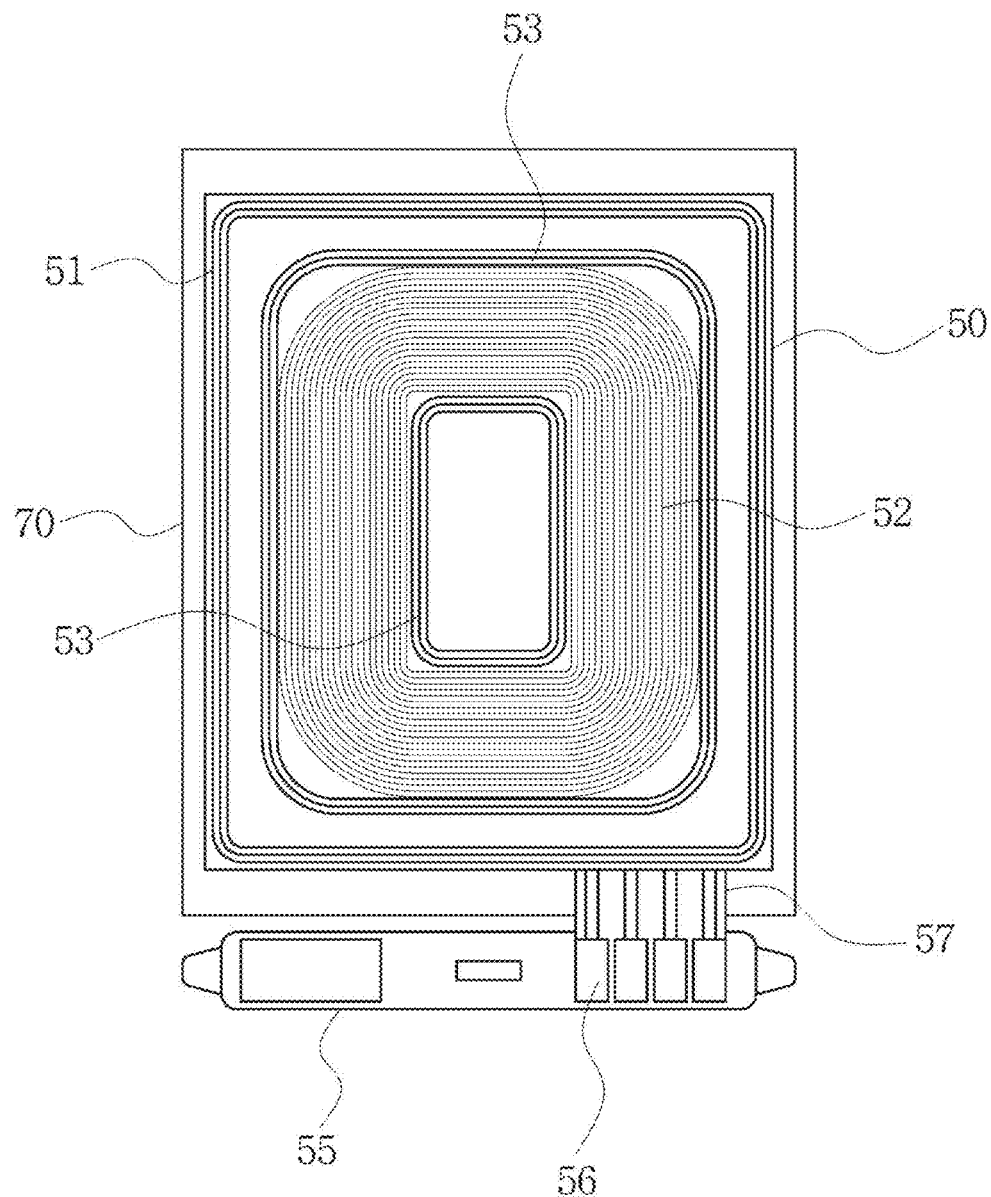

FIG. 19 is a view showing a state of the part unit 55 and the loop coil 50 connected using a flexible connection line 57 so as to be bent to each other. At this point, the flexible connection line 57 is a connection line made in a method the same as that of a general flexible printed circuit (FPC), which is manufactured by printing a conductive line on a flexible resin substrate. Of course, it does not necessarily need to use the FPC, but if two parts can be connected using a flexible connection line, it is apparent that this may be applied to the present invention.

Here, an external connection terminal 56 is also provided, and the external connection terminal 56 is a terminal for electrically connecting the battery to a cellular phone or an electronic device. At this point, the terminal 56 is provided on the top surface of the part unit substrate 55.

Figure 20:
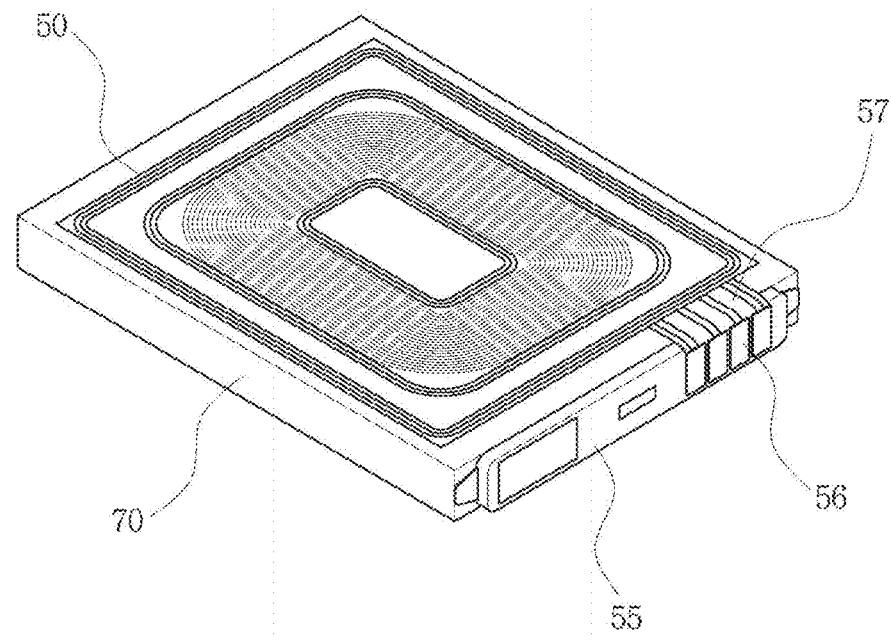

FIG. 20 is a view showing a state of the part unit substrate 55 and the loop coil substrate 50 bent by the flexible connection line 57. As shown in the figure, the external connection terminal 56 is provided on the top of the part unit substrate 55 in order to provide a structure for connecting to outside when the part unit substrate 55 is bent. In this manner, the loop coil substrate 50 is attached to the surface of the battery 70, and the part unit substrate 55 is attached to the side surface of the battery 70.

Figure 21:
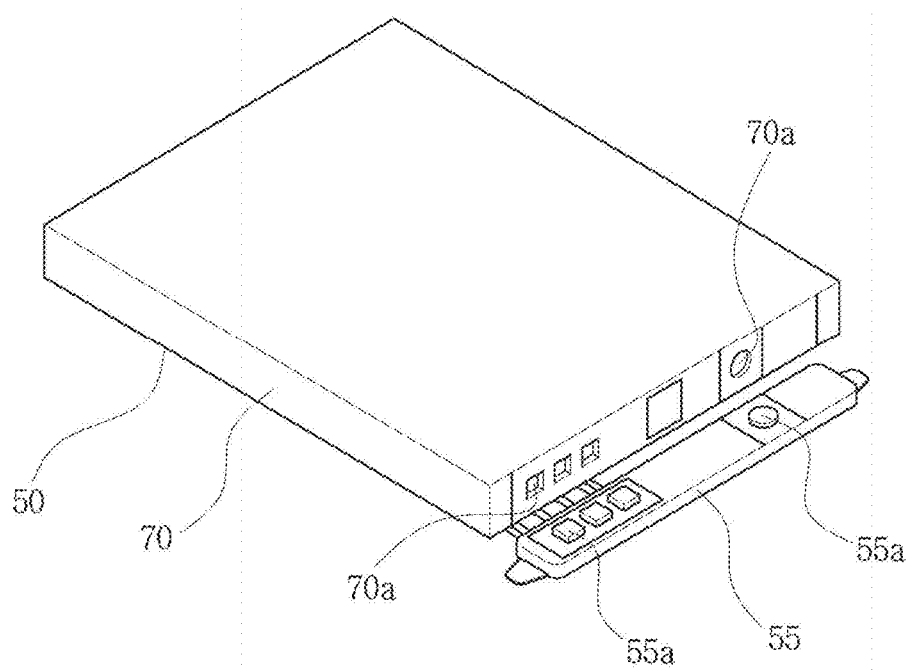
Figure 22:
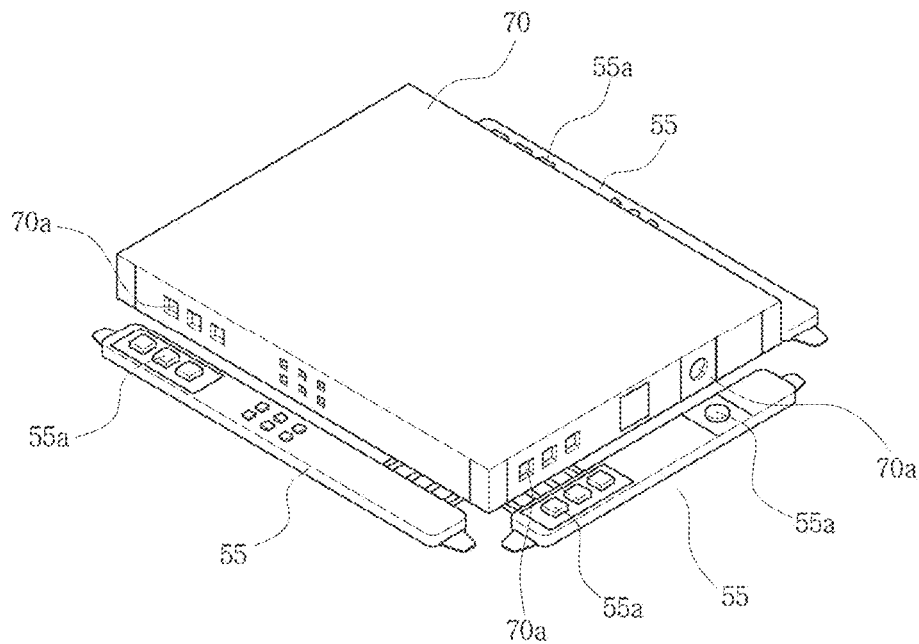

Meanwhile, FIGS. 21 and 22 are views showing the principle of mounting the part unit substrate 55 on the side surface of the battery 70. That is, the parts mounted on the part unit substrate 55 are formed to protrude as shown in FIG. 14, and depressions 70a for placing the parts are provided on the side surface of the battery 70 so that the protruded parts 55a may be attached on the side surface of the battery 70. A separate plastic structure is used to provide the depressions on the side surface of the battery 70. That is, the depressions are not formed on the side surface of the battery 70, but the separate plastic structure formed with the depressions is attached to the side surface of the battery 70.

Meanwhile, FIG. 22 is a view showing an embodiment of attaching the part unit substrate 55 on three side surfaces, rather than attaching the part unit substrate 55 on one side surface as shown in FIG. 21. That is, the part unit substrate 55 may be attached on one side surface or on two or three side surfaces, and, apparently, it may be attached on four side surfaces in some cases.

In addition, it is configured such that the parts 55a are not shown when the part unit substrate 55 is attached on the side surface of the battery 70 as shown in FIG. 20 and the parts 55a are shown when the part unit substrate 55 is detached from the side surface of the battery 70 as shown in FIG. 21 or 22. To this end, the parts 55a are formed on the inner surface of the part unit substrate 55 from the viewpoint of attaching the part unit substrate 55 on the side surface of the battery 70.

Figure 23:
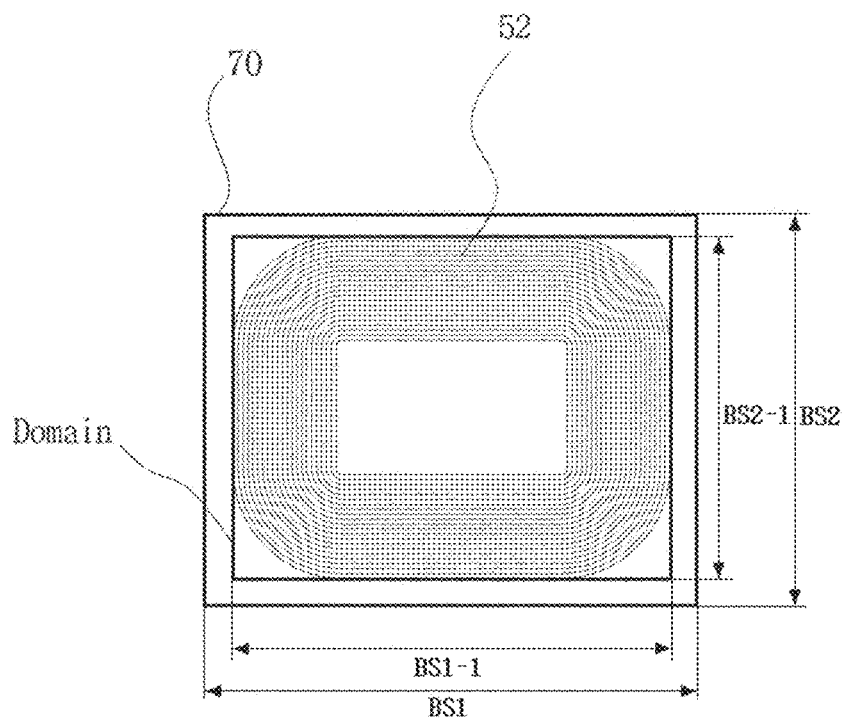

FIG. 23 is a view showing a domain where the antenna loop coil 52 is formed on the surface of the battery. Generally, the battery 70 is not an exact rectangular shape, and the loop coil 52 is not a rectangular shape furthermore.

However, although the battery is not a rectangular shape, the rectangular shape can be formed using connection lines on the four sides of the battery, and the rectangular shape of the loop coil 52 can be formed by connecting the outermost parts of the loop coil 52. Although only one loop coil 52 is shown in FIG. 23, it is apparent that other loop coils 51 and 53 may be formed. That is, although a plurality of coils is used, a rectangular shape can be made by connecting the outermost parts. Then, a domain where a coil is formed may be expressed.

If it is assumed that two sides of the rectangle of the battery are respectively BS1 and BS2 and two sides of the rectangle of the loop coil are respectively BS1-1 and BS2-1, a ratio of the sides may be considered. If the area of the loop coil formed on the surface of the battery 70 is too small, the magnetic field area of the wireless power is also decreased, and thus the charging efficiency is lowered as much. Accordingly, it is apparent that the area of the loop coil should be larger than a predetermined area. In addition, if the loop coils 51, 52 and 53 are formed on the surface of the battery so as to be seen with naked eyes, an effect from the viewpoint of design should be considered.

In addition, a ratio of one side of the rectangle of the battery to one side of the rectangle of the loop coil may be considered taking into account these points, and since a ratio of 70% may be appropriate, the following relation may be established.

$$(BS1\text{-}1)/(BS1) > 0.7$$

$$(BS2\text{-}1)/(BS2) > 0.7$$

In addition, if the part unit substrate 55 is also formed on the surface of the battery 70 as shown in the embodiment of FIG. 18, the area occupied by the coil is relatively decreased, and thus the following relation may be considered.

$$(BS1\text{-}1)/(BS1) > 0.6$$

At this point, although the maximum value of the ratio may be 1.0, the ratio may be about 0.99 so that the battery and the coil loop may have almost the same size.

In addition, if it is assumed that the ratio is 0.7, the area of the loop coil domain may be 49% or more of the area of the rectangle of the battery. However, since the actual shape of the loop coil may be a circular shape or a rectangular shape including curved lines and the inner side of the coil may be empty, the area of the pure loop coil must be much smaller. That is, the actual area of the loop coil may be only 20 to 80% of the area of the domain.

Meanwhile, the antenna loop coils 51, 52 and 53 may be directly attached on the surface of the battery without using a separate antenna loop coil substrate 50. In this case, the antenna loop coils 51, 52 and 53 may be attached on the surface of the battery using a tape or the like. In addition, it is apparent that the antenna loop coils 51, 52 and 53 may be attached on the surface of the battery 70 using a film of a size capable of covering all the antenna loop coils 51, 52 and 53. At this point, an adhesive may be coated on the film, or the film may be attached using a tape.

Embodiment 6

FIGS. 24 to 27 are views showing an embodiment of attaching a reception unit on the side surface of a battery travel charger.

Figure 24:
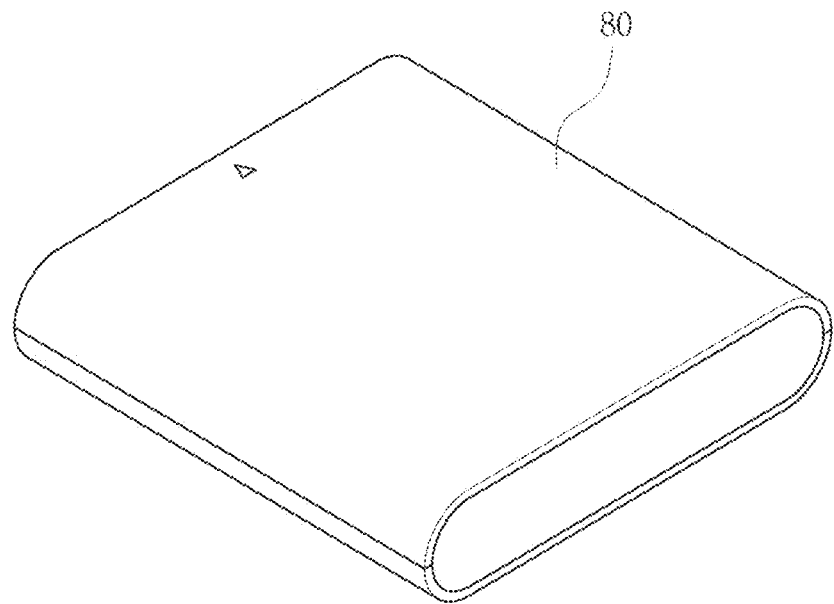
FIGS. 24 to 27 are views showing an embodiment of attaching a reception unit on the side surface of a battery travel charger.
Figure 25:
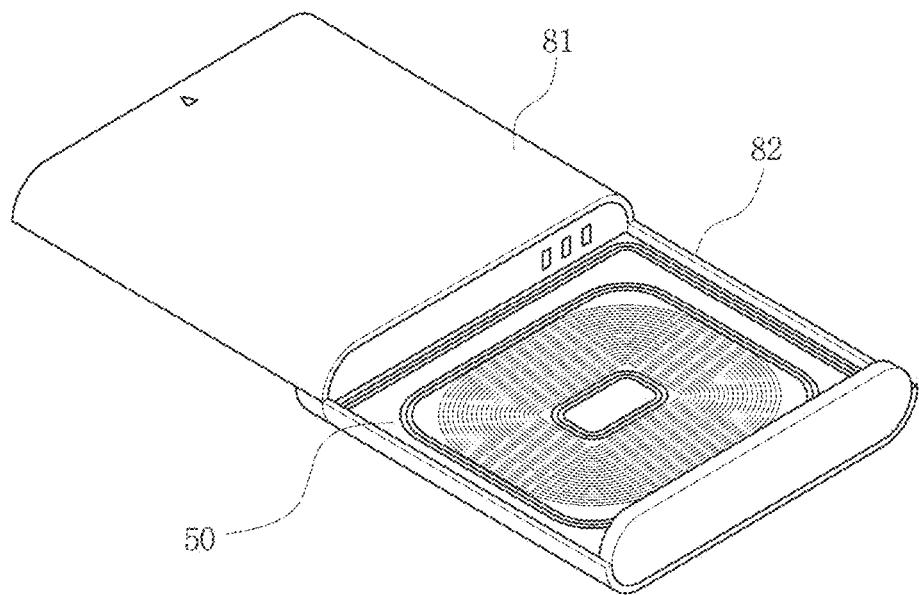

FIG. 24 is a view showing a state of a closed battery travel charger 80, and FIG. 25 is a view showing a state of an opened battery travel charger 80. In addition, it is shown that the loop coil substrate 50 of the transmission unit is attached on the bottom of the lower case.

Figure 26:
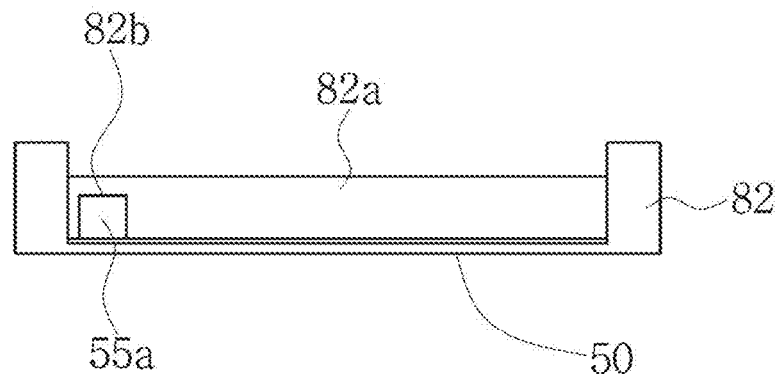
Figure 26:
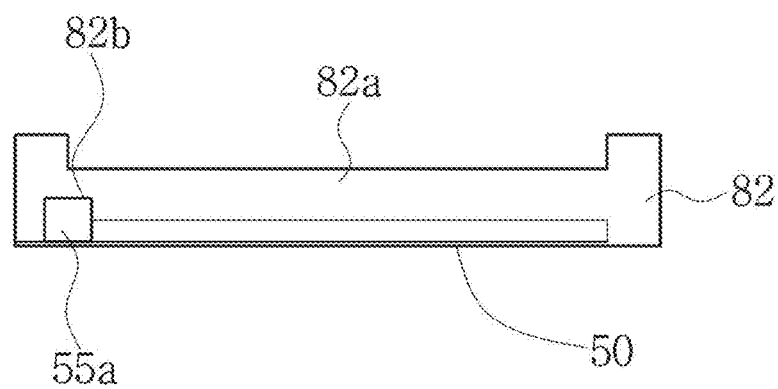

At this point, FIG. 25 is a view showing that the loop coil substrate 50 of the transmission unit is attached, and the actual position seen from the cross section is shown in FIG. 26. It is preferable that the loop coil substrate 50 is positioned as low as possible, and accordingly, the loop coil substrate 50 is provided at a position lowest possible as shown in FIG. 26.

That is, it may be configured such that the loop coil substrate 50 is attached on the bottom surface of the lower case 82 and a lower cover 83a covers the loop coil substrate 50 as shown in Part (A) of FIG. 26, or the loop coil substrate 50 may be attached from outside of the lower case 82 as shown in Part (B) of FIG. 26. Meanwhile, although the part 55a of the transmission unit may be mounted in a space separately prepared inside the case, it is apparent that efficiency of the space may be enhanced by configuring a groove space 82b on the lower case 82 and mounting the part 55a in the groove space 82b.

Figure 27:
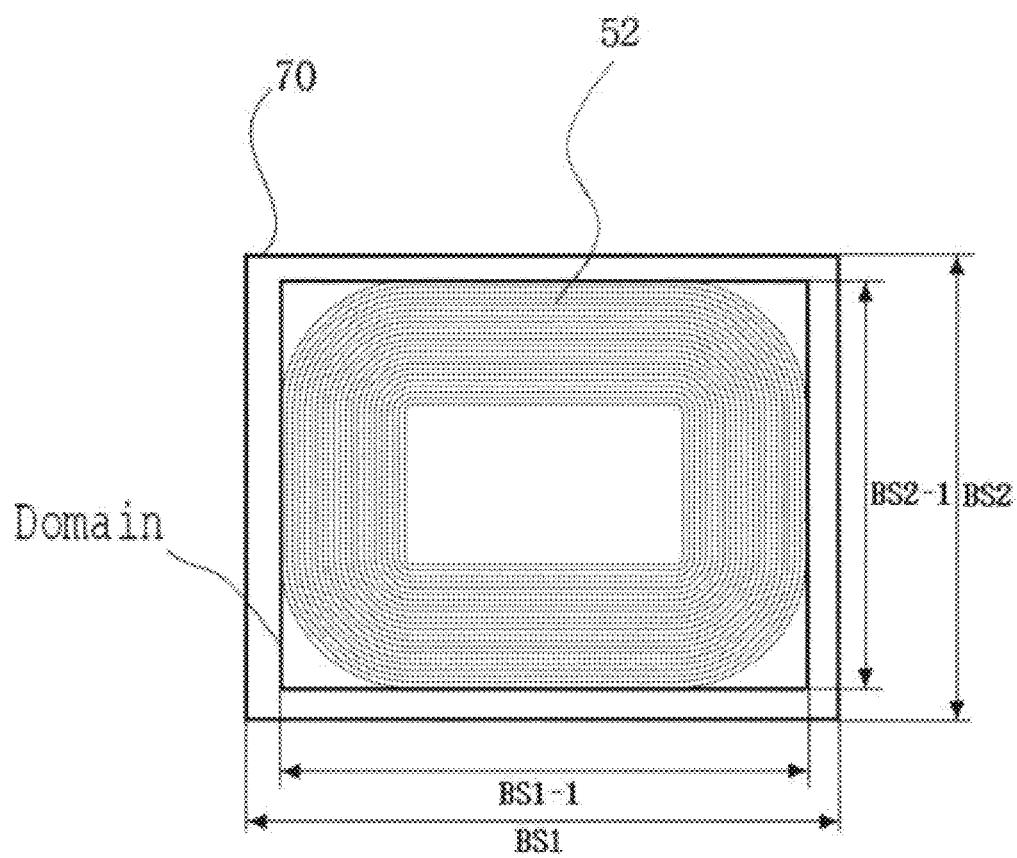

FIG. 27 is a view showing a ratio of a domain occupied by the loop coil in the battery travel charger.

That is, FIG. 27 is a view showing a domain where the antenna loop coil 52 is formed on the surface of the battery travel charger 80. Generally, the battery travel charger 80 is also not an exact rectangular shape, and the loop coil 52 is not a rectangular shape furthermore.

However, a rectangular shape can be formed using connection lines on the four sides of the battery travel charger 80, and a rectangular shape of the loop coil 52 can be formed by connecting the outermost parts of the loop coil 52. Although only one loop coil 52 is shown in FIG. 27, it is apparent that other loop coils 51 and 53 may be formed. That is, although a plurality of coils is used, a rectangular shape can be made by connecting the outermost parts. Then, a domain where a coil is formed may be expressed.

If it is assumed that two sides of the rectangle of the battery travel charger 80 are respectively TS1 and TS2 and two sides of the rectangle of the loop coil are respectively TS1-1 and TS2-1, a ratio of the sides may be considered. If the area of the loop coil formed on the surface of the battery travel charger 80 is too small, the magnetic field area of the wireless power is also decreased, and thus the charging efficiency is lowered as much. Accordingly, it is apparent that the area of the loop coil should be larger than a predetermined area. In addition, if the loop coils 51, 52 and 53 are formed on the surface of the battery so as to be seen with naked eyes, an effect from the viewpoint of design should be considered.

In addition, a ratio of one side of the rectangle of the battery travel charger to one side of the rectangle of the loop coil may be considered taking into account these points, and since a ratio of 70% may be appropriate, the following relation may be established.

$$(TS1\text{-}1)/(TS1) > 0.7$$

$$(TS2\text{-}1)/(TS2) > 0.7$$

At this point, although the ratio may be 1.0, it may be about 0.99 so that the battery travel charger and the coil loop may have almost the same size.

In addition, the area of the pure loop coil must be much smaller, and the actual area of the loop coil may be only 20 to 80% of the area of the domain.

Meanwhile, although the coil 52 for receiving wireless power energy and the NFC coil 51 may be formed in one piece in the present invention, it is shown that they may not be formed in one piece. That is, only the wireless power reception coil 52 may be provided, or the wireless power reception coil 52 and the NFC coil 51 may be provided together.

Or, in the receiver for a wireless charging system, when the coils are provided on the battery, the area where the coils are provided is 40 to 90% of the area of the battery surface.

Embodiment 7

FIGS. 28 to 31 are views showing embodiments of forming a loop coil inside a case of a device.

In this embodiment, the device may be a portable terminal, a cellular phone, or other electronic devices. At this point, other devices are devices using a battery charged by receiving wireless power energy.

Figure 28:
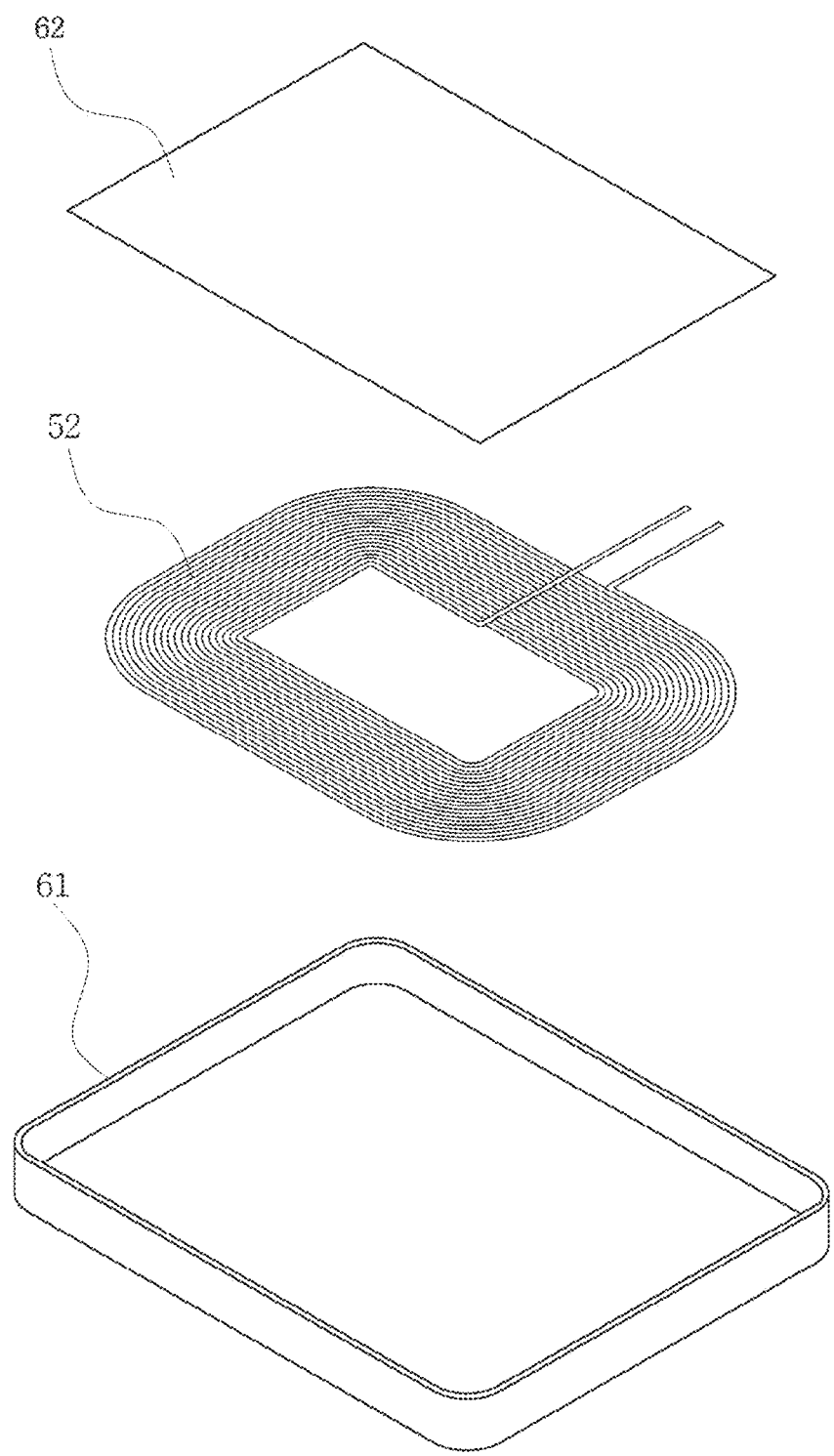
FIGS. 28 to 31 are views showing embodiments of forming a loop coil inside the case of a device.

FIG. 28 is a view showing an embodiment of a method of attaching a loop coil 52 on a lower case 61 and attaching a film 62 or the like on the loop coil 52. At this point, since the loop coil 52 is merely a symbolic notation, it is apparent that the loop coil 52 may be two or more loop coils 51, 52 and 53 or a substrate on which the loop coil is formed.

In the same way, the film 60 is also merely a symbolic notation, and it may be regarded as a fixing means for attaching the loop coil 52 or the substrate 50 to the lower case 61. That is, the film 62 may be fixed to the lower case 61 by coating an adhesive on the film 62, or the film may be fixed to the lower case using a tape. Apparently, only the tape can be used instead of the film 62.

In addition, when the loop coil is formed on the substrate 50, a method of attaching or fixing the substrate 50 to the lower case is used, or the substrate may be fixed to the lower case 61 as is instead of the film 60. At this point, it is apparent that an adhesive, a tape, a fixing screw, a fixing pin or the like may be used.

Figure 29:
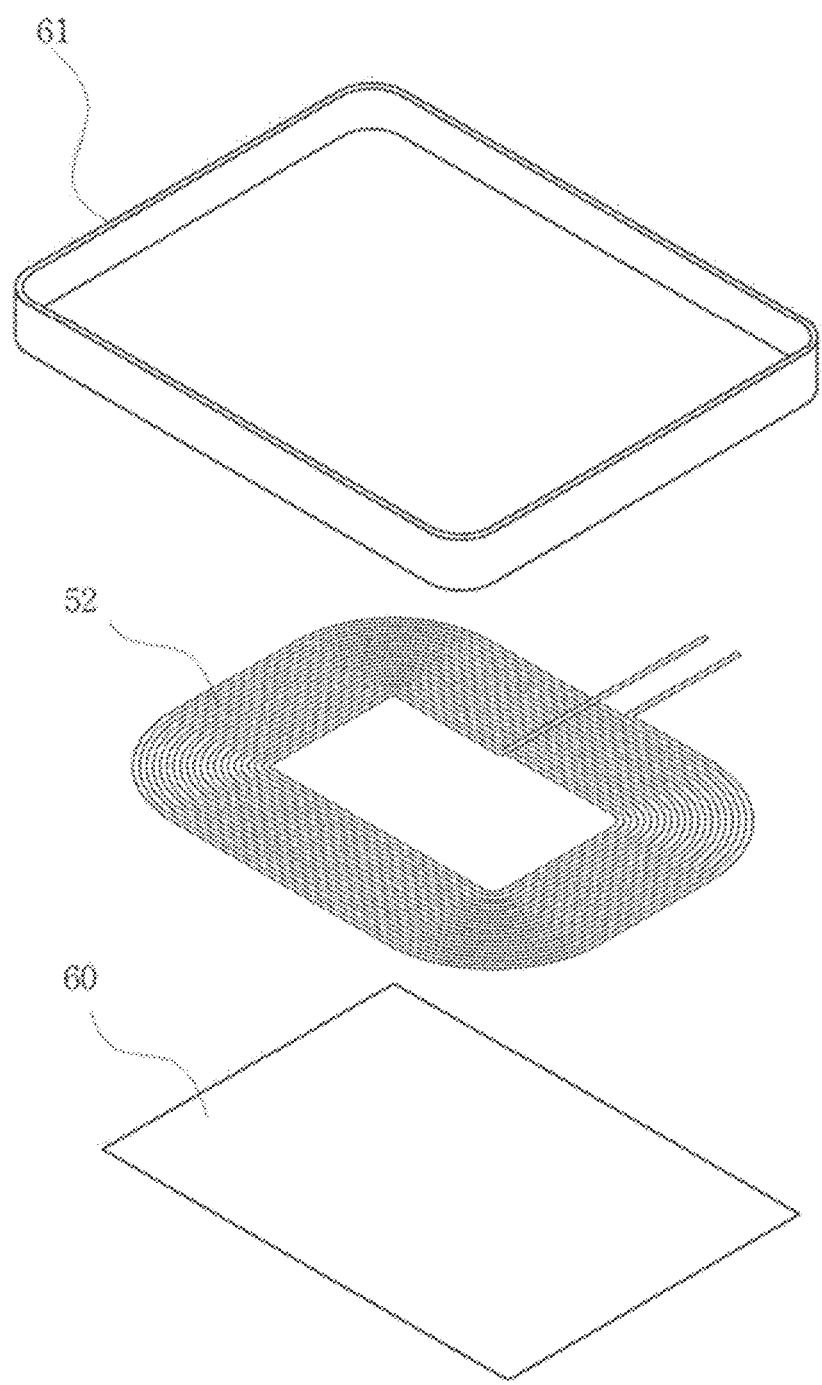

FIG. 29 is a view showing an embodiment of attaching a loop coil 29 (it can be two or more loop coils or a substrate on which the loop coils are formed) below the lower case 61 and attaching a film 62 below the loop coil 29. At this point, since the film 62 is exposed to outside of the lower case as is, it is preferable to use a little thicker film 62. It may be as thick as a kind of plate, but preferably less than 1 mm. In addition, the attaching method is the same as that of the embodiment of FIG. 21.

Figure 30:
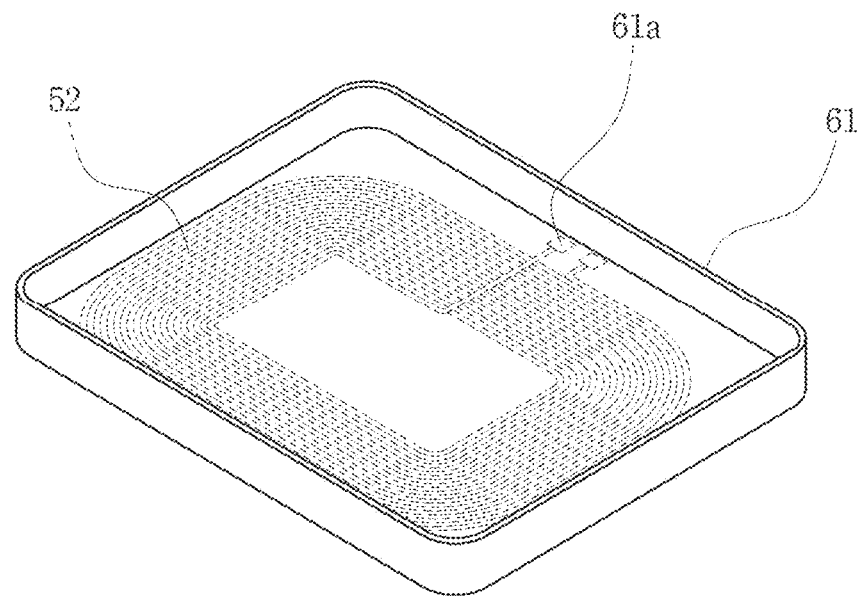

FIG. 30 is a view showing an embodiment of forming a loop coil inside the lower case.

The loop coil 52 (two or more loop coils or a substrate) is expressed as a dotted line in FIG. 30, and this is to express that the loop coil 52 is formed inside the lower case.

In order to form the loop coil 52 inside the lower case 61, a method of inserting the loop coil 52 (in the present invention, it means two or more loop coils or a substrate) inside a cast and injecting the lower case is used when the lower case is injected. That is, a method of inserting a shape of a thin substrate (a loop coil or a substrate on which the loop coil is formed may be referred to as a shape of a thin substrate) inside a general type case and injecting the lower case may be used. However, thickness of the lower case is considered at this point, and thickness of the loop coil 52 is preferably less than 1 mm so as to easily insert the loop coil inside the cast.

Meanwhile, a means for connecting the inner loop coil and an outer circuit is needed when the loop coil is formed inside the lower case, and a connection terminal 61a is formed at the lower case 61 for the connection. At this point, when the lower case is injected, the connection terminal 61a may be formed by inserting the connection terminal 61a inside the cast while it is connected to the loop coil.

Figure 31:
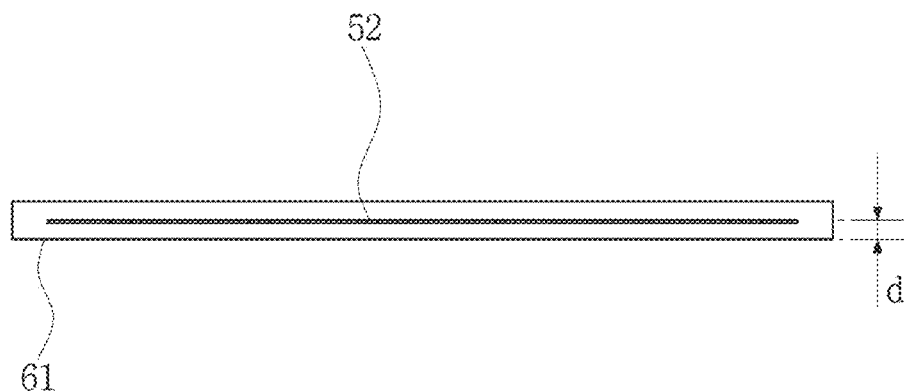

FIG. 31 is a view showing a distance "d" from the bottom to the loop coil 52 when the loop coil 52 is formed in the lower case 61. The distance is determined considering the maximum thickness of the lower case and the distance between the wireless power energy transmission unit and the coil of the reception unit. That is, a value of "d" is appropriate to be less than 1.5 mm. However, in the embodiment of FIGS. 29 and 30, the "d" value is appropriate to be less than 1.0 mm.

In addition, the "d" value shown in FIG. 31 is a value that can be applied when the loop coil is mounted on the battery and when the loop coil is mounted on the battery travel charger.

Figure 32:
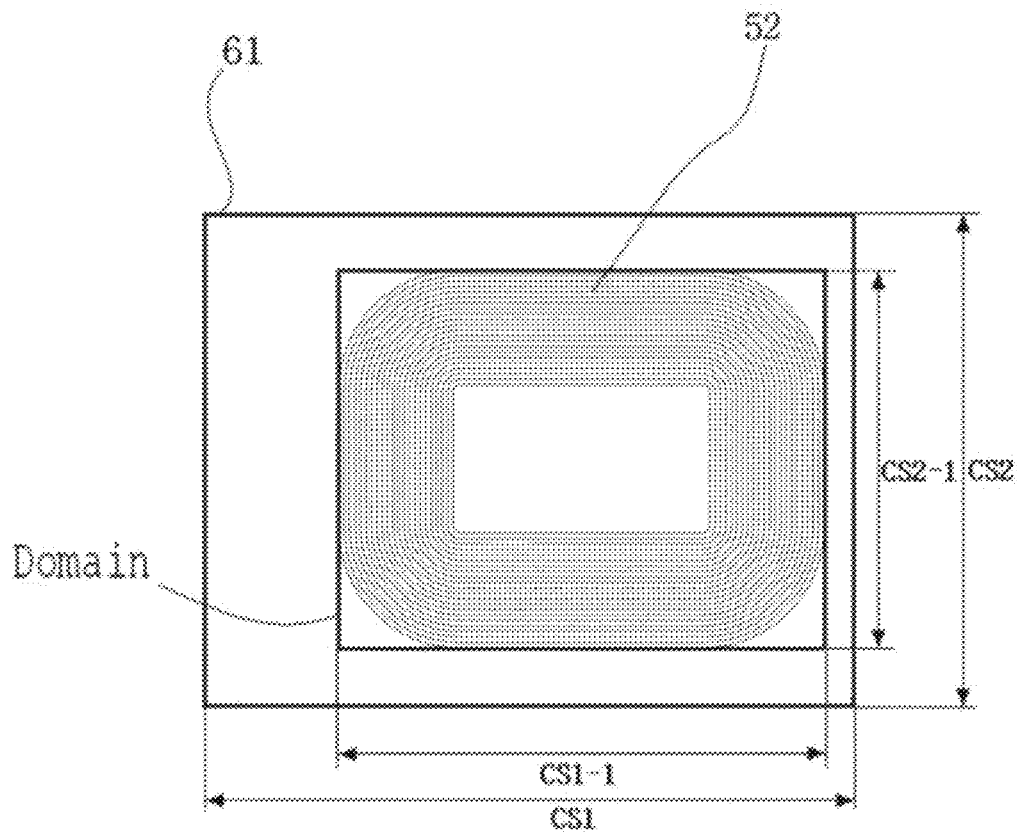
FIG. 32 is a view showing a domain where a loop coil is formed in a lower case.

FIG. 32 is a view showing a domain where a loop coil is formed in a lower case.

That is, FIG. 32 is a view showing a domain where the antenna loop coil 52 is formed on the surface of the lower case 61. Generally, the lower case 61 is not an exact rectangular shape, and the loop coil 52 is not a rectangular shape furthermore.

However, a rectangular shape can be formed using connection lines on the four sides of the lower case 61, and a rectangular shape of the loop coil 52 can be formed by connecting the outermost parts of the loop coil 52. Although only one loop coil 52 is shown in this embodiment, it is apparent that other loop coils 51 and 53 may be formed. That is, although a plurality of coils is used, a rectangular shape can be made by connecting the outermost parts. Then, a domain where a coil is formed may be expressed.

If it is assumed that two sides of the rectangle of the lower case 61 are respectively CS1 and CS2 and two sides of the rectangle of the loop coil are respectively CS1-1 and CS2-1, a ratio of the sides may be considered. If the area of the loop coil formed on the surface of the lower case 61 is too small, the magnetic field area of the wireless power is also decreased, and thus the charging efficiency is lowered as much. Accordingly, it is apparent that the area of the loop coil should be larger than a predetermined area. In addition, if the loop coils 51, 52 and 53 are formed on the surface of the battery so as to be seen with naked eyes, an effect from the viewpoint of design should be considered.

In addition, a ratio of one side of the rectangle of the lower case to one side of the rectangle of the loop coil may be considered taking into account these points, and since a ratio of 70% may be appropriate, the following relation may be established.

$(CS1-1)/(CS1)>0.6$ $(CS2-1)/(CS2)>0.7$

At this point, although the ratio may be 1.0, it may be about 0.99 so that the lower case and the coil loop may have almost the same size.

In addition, the actual area of the loop coil may be only 20 to 80% of the area of the domain.

Or, when the coils are provided in the lower case, the area where the coils are provided is 40 to 90% of the area of the case surface.

Embodiment 8

FIGS. 33 to 37 are views showing arrangements of a wireless power reception coil 52 and an NFC coil 51.

Although the coil 52 for receiving wireless power energy and the NFC coil 51 may be formed in one piece in the present invention, it is shown that they may not be formed in one piece.

In the present invention, a part where a wireless power reception coil or an antenna may be placed can be considered. In the present invention, the coil or the antenna may be provided on the battery 70, on the battery travel charger 80, or on the lower case 61 of a cellular phone.

At this point, forming the coil 52 for receiving wireless power energy and the NFC coil 51 in one piece means that both of the two coils 52 and 51 are provided on the battery 70, on the battery travel charger 80 or on the lower case 61 of a cellular phone.

In addition, forming the coils not in one piece means that the coil 52 for receiving wireless power energy is provided on the lower case 61 and the NFC coil 51 is provided on the battery 70, or the coil 52 for receiving wireless power energy is provided on the battery 70 and the NFC coil 51 is provided on the lower case 61.

That is, in an example other than the example described above, forming the coils in one piece means that the two coils exist in the same part, and forming the coils not in one piece means that the coils do not exist in the same part.

Of course, it is apparent that the coils 51 and 52 may not exist on the battery or the lower case, but may exist between 61-1 the lower case 61 and the parts of the cellular phone in the form of a film.

Then, a considerably large number of cases of forming the coils in one piece and not in one piece may occur.

That is, although the wireless power reception coil 52 may exist between 61-1 the battery 70 and the lower case 61 and the NFC coil may also exist between 61-1 the battery 70 and the lower case 61, if the coils do not exist in the same place, they are not formed in one piece.

In addition, forming the coils in one piece means that the coils 51 and 52 exist together between 61-1 the battery 70 and the lower case 61.

In addition, it is apparent that when the coils 51 and 52 exist between 61-1 the parts of the cellular phone and the lower case, the coils 51 and 52 are wrapped with a film or a ferrite sheet.

Meanwhile, it is apparent that although the coil 51 may a coil of one charging method, the coil may a coil of two or more charging methods (see FIG. 3 of the present invention).

Figure 33:
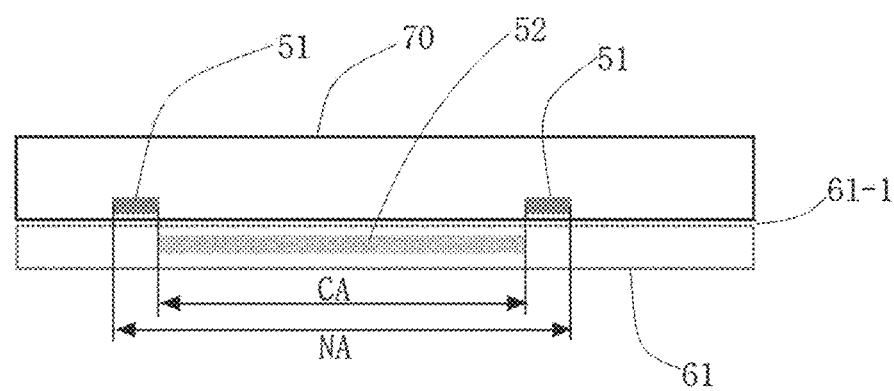
FIGS. 33 to 37 are views showing arrangements of a wireless power reception coil 52 and an NFC coil 51.

FIG. 33 is a view showing an embodiment of the coils formed not in one piece.

The domain of the wireless power reception coil 52 and the domain of the NFC coil should not overlap with each other.

That is, a domain CA of the coil 52 is formed at an area where the NFC coil 51 is not formed in the entire domain NA where the NFC coil 51 is formed. Of course, although some portions of the domains may be partially overlapped, they should not be overlapped as much as to hinder communication.

In addition, although an embodiment of providing the NFC coil 51 above the coil 52 is shown, the coils should not overlap with each other even when the NFC coil 51 is provided below the coil 52.

In addition, although FIG. 30 is a view showing an embodiment of providing the coil 52 inside the domain of the NFC coil 51, it is apparent that although the coil 52 is provided outside the domain of the NFC coil 51, the coils should not overlap with each other.

Figure 34:
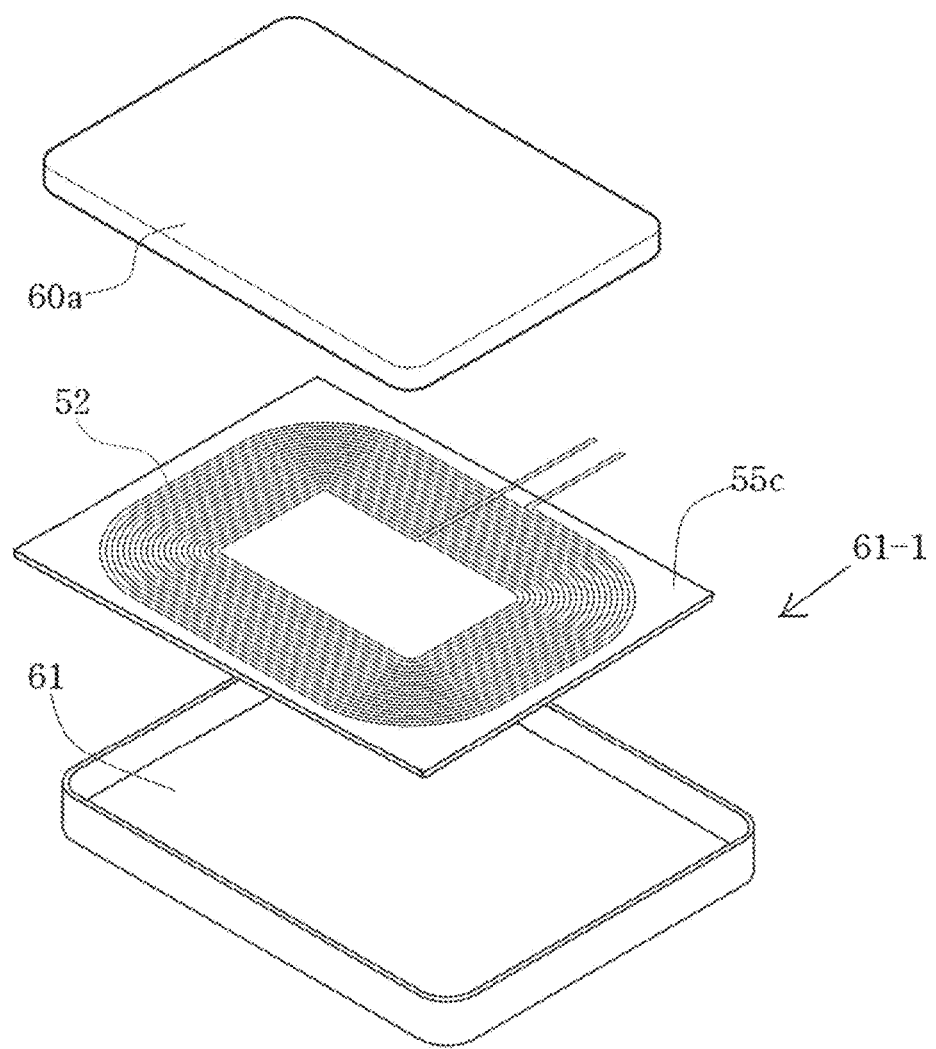

FIG. 34 is a view showing an embodiment of providing the coil in a domain 61-1 between the part 60a of a cellular phone and the lower case 61. Although it is shown in FIG. 31 that only the wireless power reception coil 52 is provided, it is apparent that the NFC coil 51 may also be provided together in reality.

In addition, providing the coils in the in-between domain 61-1 means that the coils 51 and 52 of the present invention are provided not to be attached to the lower case 61 and not to be attached to the part (e.g., a battery or the like) of the cellular phone.

In addition, the part 60a of the cellular phone generally means the battery 70 or other parts. In addition, although the coils 52 and 51 may be provided on the substrate when the coils are provided in a domain 61-1 between the part 60a of the cellular phone and the lower case 61, it is apparent that the coils 52 and 51 may be provided in a state being wrapped by an insulation film 55c. In addition, although it is not show in the figure, a ferrite sheet may be further provided between the coils 52 and 51 and the part.

Figure 35:
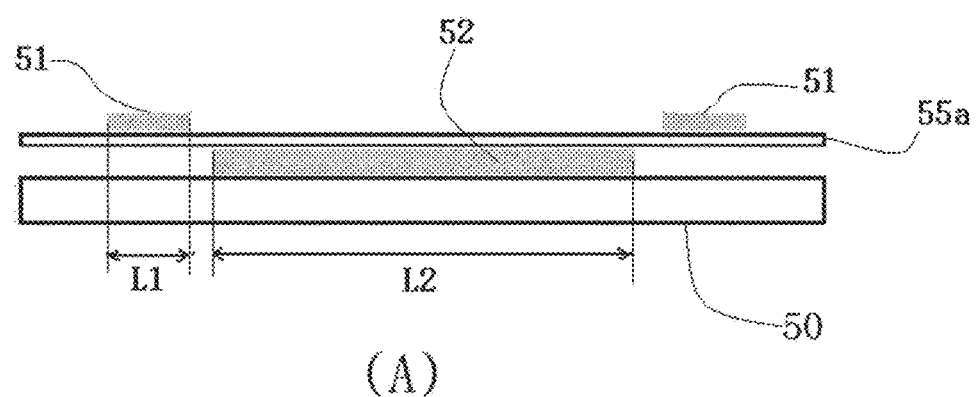
Figure 35:
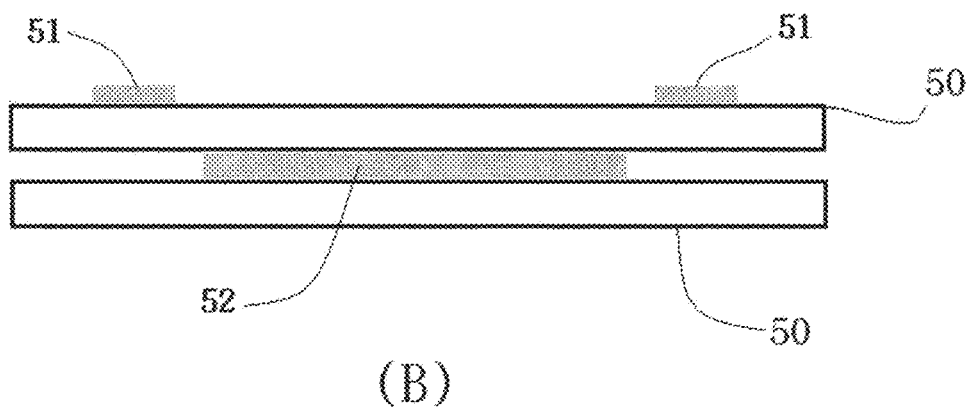

FIG. 35 is a conceptual view showing the cross-sectional positions of the coil 52 and the NFC coil 51 when they exist in one piece. It shows that the wireless power reception coil 52 and the NFC coil 51 may be provided in one piece in the present invention.

As shown in Part (A) of FIG. 35, the coil 52 and the NFC coil 51 are formed on the same substrate, and the insulation layer 55a may be coated therebetween. In addition, as shown in Part (B) of FIG. 35, the coil 52 and the NFC coil 51 may be formed on different substrates 50. In addition, it is apparent that a general flexible substrate is used as the substrates 50.

Meanwhile, a relative ratio of the coil 51 and the NFC coil 51 may be determined, and the coil 52 is provided inside the NFC coil 51 in the present invention. Accordingly, the length L1 of the NFC coil 51 may be the thickness of the NFC coil 51 (it is not a vertical thickness, but a horizontal thickness). On the other hand, L2 denotes a distance of a domain occupied by the coil 52. (That is, although the inner side of the coil 52 may be empty like a donut shape, the empty portion is also included in the coil 52.)

In the present invention, the length of L2 is set to be at least two or more times longer than the length of L1. The reason is to maximize reception of wireless power energy.

In addition, preferably, the coil 52 and the NFC coil 51 are spaced apart from each other by a certain distance (which means a horizontal distance in the figure). In addition, the spaced distance is preferably between 1 to 10 mm. In addition, the most optimum spaced distance is preferably about 5 mm.

Meanwhile, the coils 51 and 52 do not necessarily need to be provided on a substrate in order to implement the present invention. It means that the coils may be attached to each part as they are. However, when the coils are provided in-between 61-1, it is apparent that the coils 61-1 may be provided after being coated with a film or the like.

Figure 36:
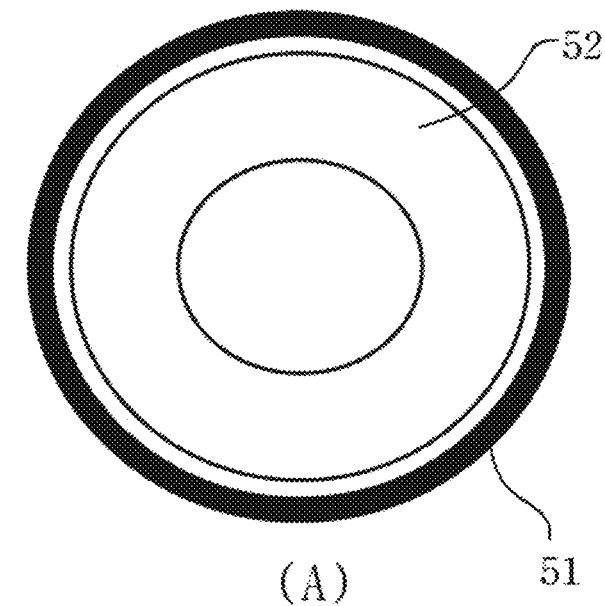
Figure 36:
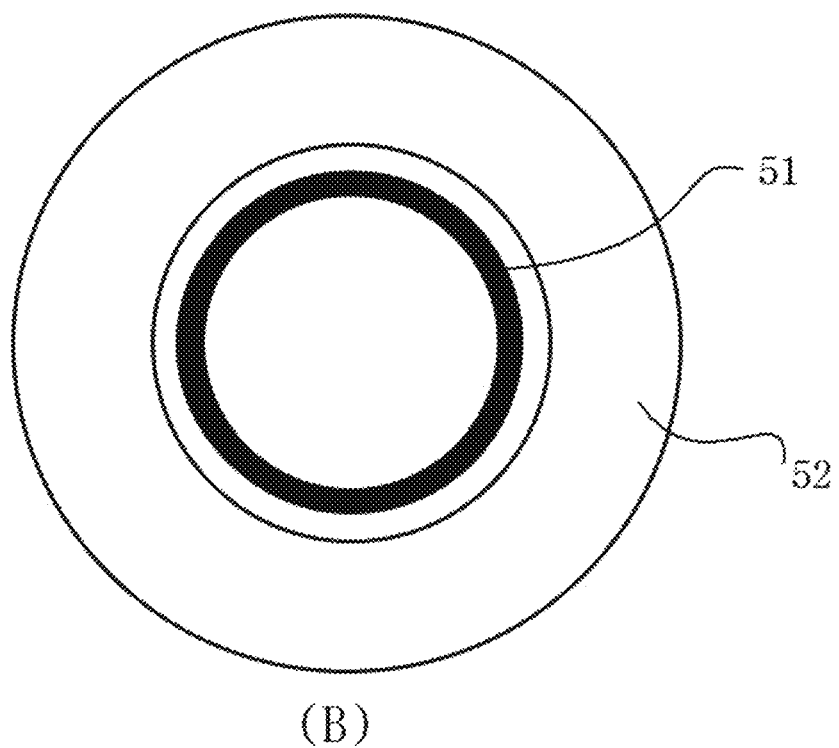

FIG. 36 is a view showing another embodiment. That is, when a cellular phone is as small as less than five inches, it is general that the coil 52 is provided inside the NFC coil 51 as shown in Part (A) of FIG. 36. However, when a cellular phone is as large as ten or seven inches, the coil 52 may be provided outside the NFC coil 51 in some cases.

Figure 37:
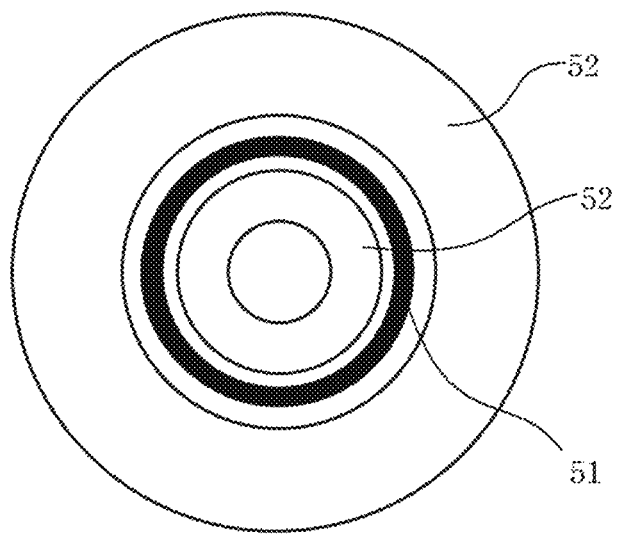

FIG. 37 is a view showing still another embodiment of coil arrangement, in which the coil 52 is provided inside the NFC coil 51, and the coil 52 is also provided outside the NFC coil 51. That is, the wireless power reception energy may be maximized by increasing the area and size of the coil 52.

Embodiment 9

Figure 38:
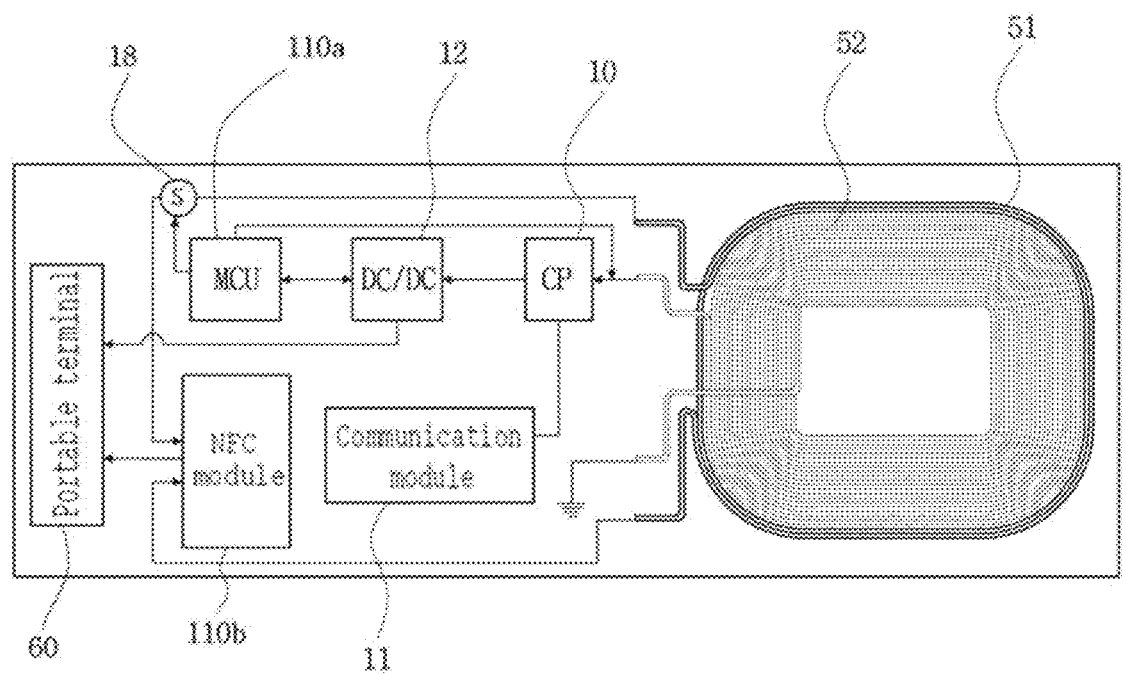
FIGS. 38 to 40 are views showing embodiments describing controls between coils.
Figure 39:
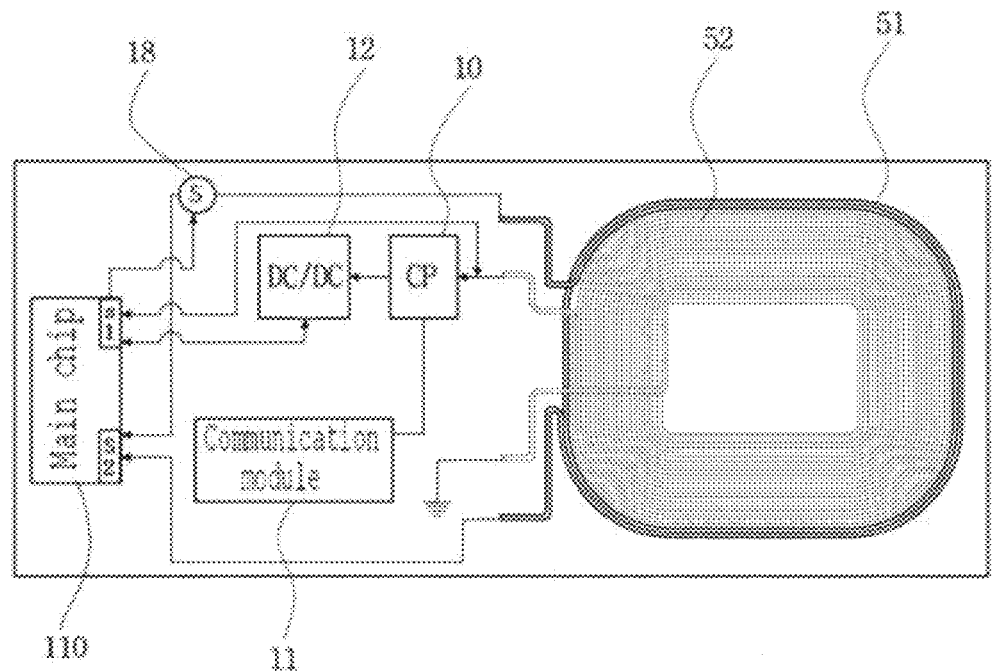
Figure 40:
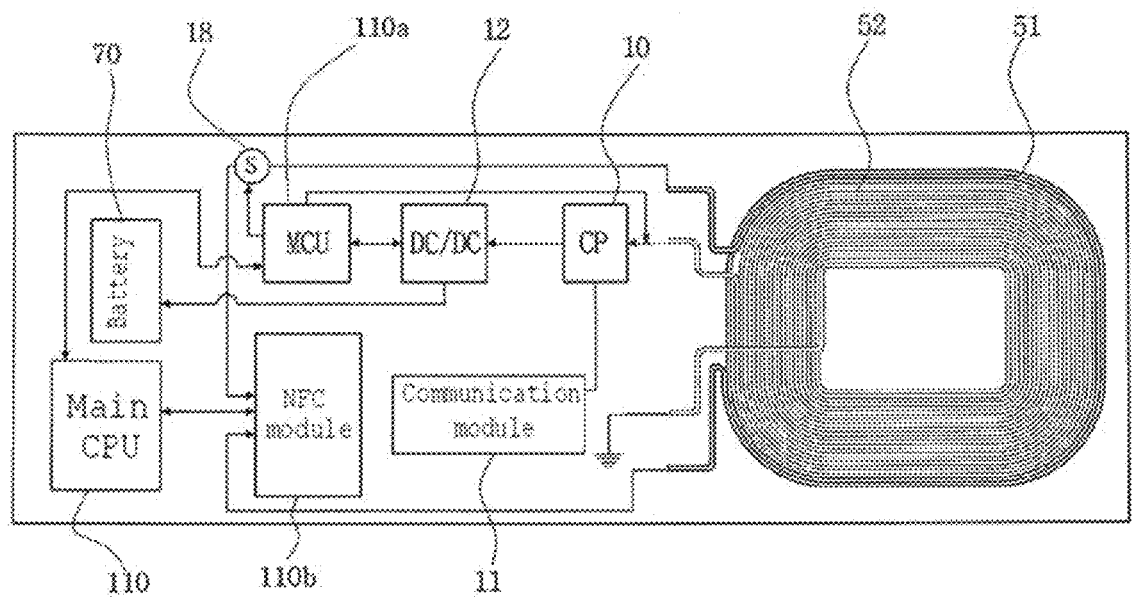

FIGS. 38 to 40 are views showing embodiments describing controls between the coils.

Generally, the NFC coil 51 always maintains an 'on' state. Maintaining the 'on' state means that the NFC coil 51 is always connected to a module which controls the NFC coil 51.

However, if the wireless power reception coil 52 transmits wireless power reception energy, the NFC coil maintains an 'off' state. At this point, maintaining the 'off' state means that connection between the NFC coil 51 and the module which controls the NFC coil 51 is shut down.

FIG. 38 is a block diagram showing an embodiment describing the principle of coil control.

The procedure of supplying the portable terminal 60 with power energy that the coil 52 receives is similar to that of the previous embodiment. However, the data received through the NFC coil 51 is transferred to the portable terminal 60 through a separate path.

The reception coil 52 and the NFC coil 51 are provided as shown in the figure, and the two coils are separated in terms of circuit. Accordingly, a control unit 110a for controlling the wireless power reception coil and an NFC module 110b for controlling the NFC coil 51 are separately provided. At this point, separately providing means separating the functions, and accordingly, the control unit 110a and the NFC module 110b may be implemented as separate parts, or the functions may be distinguished in one part.

Therefore, the exact meaning of separating into two paths is that a connection line from the coil 52 to the control unit 110a is separated from a connection line from the NFC coil 51 to the NFC module 110b.

The NFC module 110b means an NFC transmission module, and, in addition, the NFC transmission module is configured of an analog interface, an R/F level interface and a card mode detector and performs a function of transmitting data between terminals within a short distance of 10 cm.

Generally, the NFC is a technique of transmitting data between terminals within a short distance of 10 cm through a non-contact type near field wireless communication module which uses a frequency band of 13.56 MHz as an electronic tag (RFID). The NFC is widely used for transmission of product information by a supermarket or a general store, transmission of travel information for visitors, information on transportation, an access control locking device or the like, as well as being used for payment.

In addition, there is further provided a switch 18, and the switch may shut down a connection under the control of the control unit 110a which controls the coil, and if the connection is shut down by the switch 18, the function of the NFC coil 51 is stopped.

As a result, if the control unit 110a controls the wireless power reception coil and the wireless power reception energy is received, the control unit 110a cuts off the switch to stop the NFC function.

Meanwhile, a method other than the method presented in the present invention may be used as a method of stopping the NFC function when the wireless power reception energy is received. The most important thing is that if the control unit 110a controls the reception coil 52, a control command for stopping the NFC function is performed.

FIG. 39 is a view showing still another embodiment, and a main CPU 110 (a chip which controls the entire cellular phone) existing inside a cellular phone 60 controls the wireless power reception coil 52 and the NFC coil 51.

That is, the main CPU 110 of a portable terminal performs the functions of the control unit 110a and the NFC module 110b of FIG. 38. To this end, a sector capable of performing the functions of the control unit 110a and the NFC module 110b is provided in the main CPU 110.

FIG. 40 shows that there is provided a cellular phone control unit 110, in addition to the control unit 110a for controlling a wireless charge coil and the NFC module 110b, and the cellular phone control unit 110 controls the control unit 110a and the NFC module 110b. In addition, when a coil appropriate to a charging method is selected, the control unit 110a disconnects or connects the switch 18.

That is, in the present invention, the NFC module for controlling the NFC coil and an MCU for controlling the coil are separately provided, and the main CPU of the cellular phone may control the NFC module and the MCU. In addition, the main CPU of the cellular phone may directly control the NFC coil and the coil.

Embodiment 10

FIGS. 41 to 44 are views showing embodiments of providing a ferrite sheet.

The ferrite sheet may have an insulation effect, and it is a part provided in the shape of a sheet to minimize the effect of magnetic fields between coils or between a coil and a part. Accordingly, the ferrite sheet is positioned between the coil and the part of the cellular phone.

Figure 41:
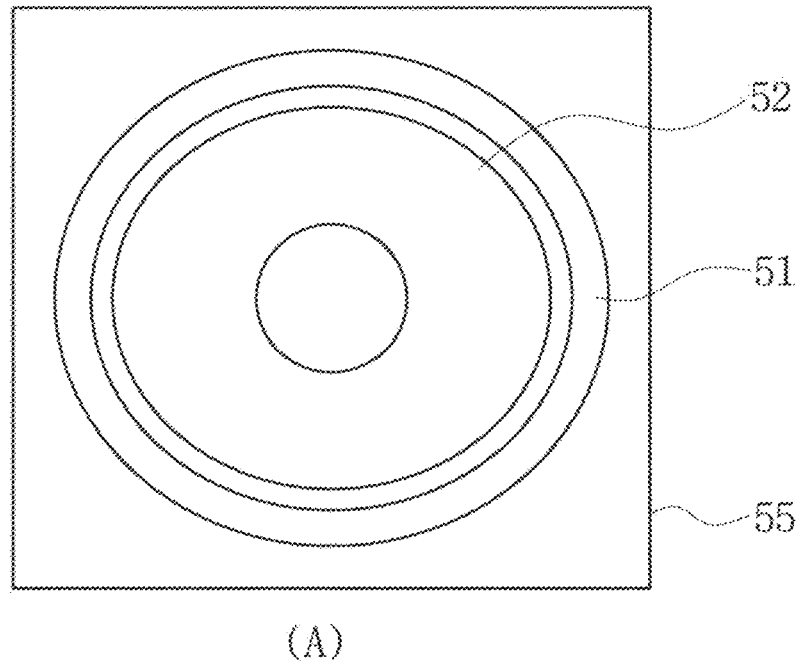
FIGS. 41 to 44 are views showing embodiments of providing a ferrite sheet.
Figure 41:
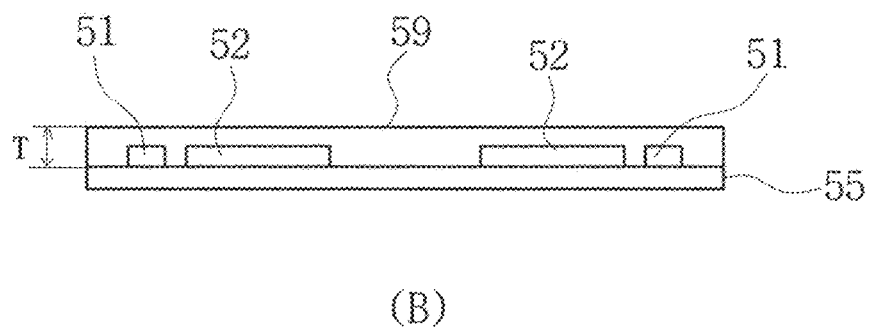

Part (A) of FIG. 41 is a top view showing a substrate 55 on which the coils 52 and 51 are formed.

In addition, Part (B) of FIG. 41 is a view showing an embodiment of providing a ferrite sheet 59 on the top of the coils. As shown in the figure, the ferrite sheet 59 is provided not only on the top of the coils 52 and 51, but also on a boundary area between the wireless power reception coil 52 and the NFC coil 51.

Since the ferrite sheet 59 is provided on a boundary area between the coils 52 and 51, the effect of magnetic fields between the wireless power reception coil 52 and the NFC coil 51 is reduced.

At this point, referring to FIG. 41, it is understood that in a configuration of cutting a groove into the ferrite, the coils 52 and 51 or the like are provided in the groove. That is, it means that an inner groove (space) is formed in a method of etching the surface of the ferrite sheet, and a coil may be form in the space. Of course, when the inner groove is formed, a laser processing method or the like may be used.

Figure 42:
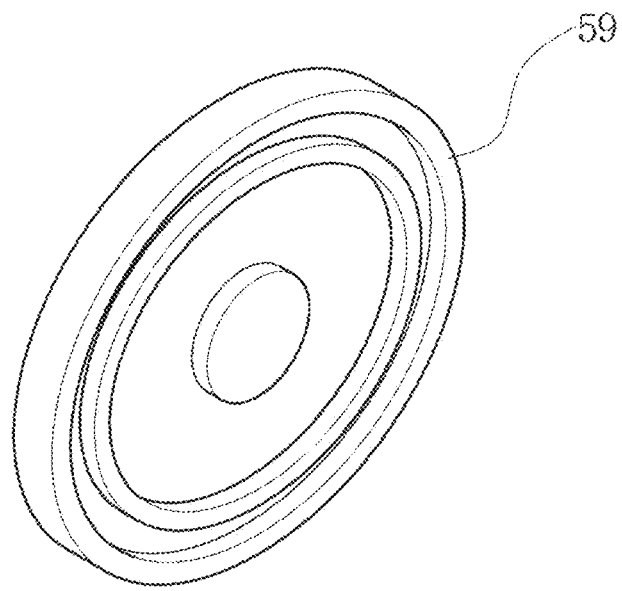

FIG. 42 is a perspective view showing the ferrite sheet 59 provided on the coils. As shown in the figure, a projection unit 59a is formed on the surface of the ferrite sheet 59 in order to provide the ferrite sheet 59 also on the boundary area between the wireless power reception coil 52 and the NFC coil 51.

Meanwhile, Parts (A) and (B) of FIG. 41 are a kind of conceptual views, which do not show the actual size as is. That is, thickness of the ferrite sheet 59 displayed in Part (A) of FIG. 41 generally does not exceed 1 mm, and the thickness does not exceed 2 mm in maximum in most cases. In the same way, thickness of the coil may be less than 0.5 mm and does not exceed 2 mm in most cases however thick it may be.

Figure 43:
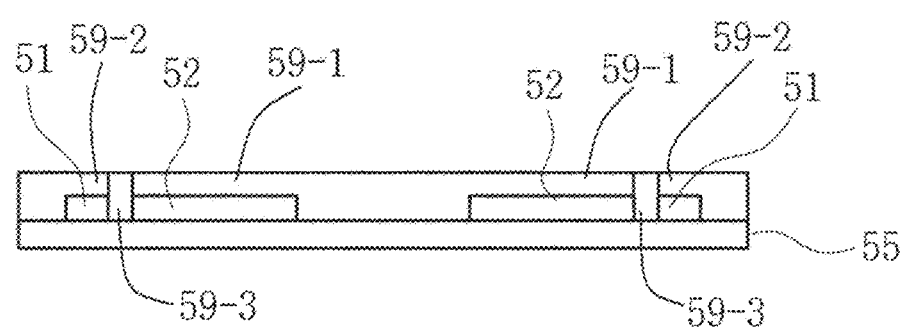

FIG. 43 is a view of an embodiment of providing a different kind of ferrite sheet in each domain.

As shown in FIG. 43, different kinds of ferrite sheets may be used for a ferrite sheet 59-1 for covering the wireless power reception coil 52, a ferrite sheet 59-2 for covering the NFC coil 51, and a ferrite sheet 59-3 existing at the boundary area between the coils 52 and 51. That is, in an embodiment of the present invention, it is shows that three different kinds of ferrite sheets 59-1, 59-2 and 59-3 are used.

Electrical characteristics of the wireless power reception coil 52 and the NFC coil 51 are different from each other, and accordingly, different ferrite sheets 59-1 and 59-2 are used accordingly. In addition, since the electrical characteristic of the boundary area between the coils is different from those of the coils 52 and 51, another different ferrite sheet 59-3 is used.

Figure 44:
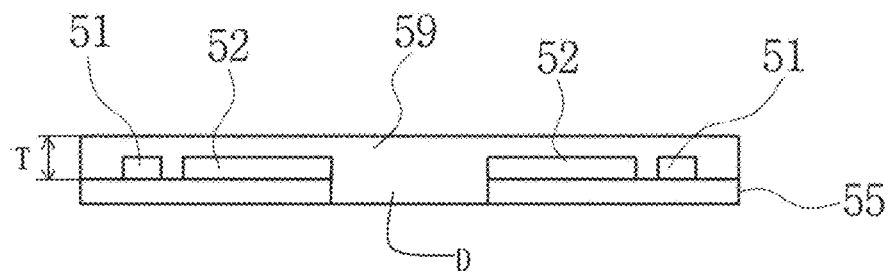

FIG. 44 is a view showing still another embodiment of mounting a ferrite sheet. As shown in the figure, a part of the substrate 55 in a domain where a coil does not exist is removed, and the ferrite sheet exists even in the removed domain.

In this case, a flexible material may be used for the ferrite sheet 59. Actually, a cellular phone is designed to tightly attach the lower case 61 and the parts and have almost no empty space. Accordingly, when the ferrite sheet 59 is mounted on the coil, it is press fitted.

At this point, if the ferrite sheet 59 is manufactured using an elastic and flexible material to be further thicker than the thickness T (a thickness fit to a space actually given between the lower case and the parts) shown in the figure, the ferrite sheet is press fitted and fills in the area where the substrate 55 is removed (the portion marked with D in the figure).

Then, although a silicon steel plate is used as the ferrite sheet, existing commercialized materials, such as manganese, zinc, ferrite, permalloy, permandur, metal glass, powder steel and the like, may be used. In addition, the zinc or the like may be used in the form of an absorber. In addition, manganese oxide, zinc oxide, iron oxide or the like may be used.

Of course, it is apparent that the ferrite sheet 59 may be manufactured from the beginning in a shape of being provided in the area 55 where the substrate is removed.

Figure 45:
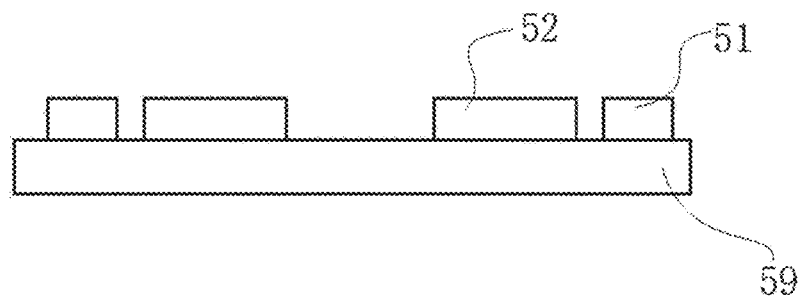
FIG. 45 is a view showing an embodiment of a structure directly forming coils on a ferrite sheet.

FIG. 45 is a view showing an embodiment of a structure in which coils are directly formed on the ferrite sheet.

Generally, the coils 52 and 51 are manufactured to be very thin in the form of a film in many cases, and in this case, the coils 52 and 51 may be directly formed on the surface of the ferrite sheet without making a groove on the ferrite sheet. That is, FIG. 45 is a view showing a ferrite sheet formed in the shape of a film.

Since the ferrite sheet, the coil and the NFC coil are manufactured as a film according to the structure described above and attached to the battery or the case as one set, marketability of the reception unit may be further enhanced.

Embodiment 11

FIGS. 46 to 49 are views showing other embodiments of providing coils.

Figure 46:
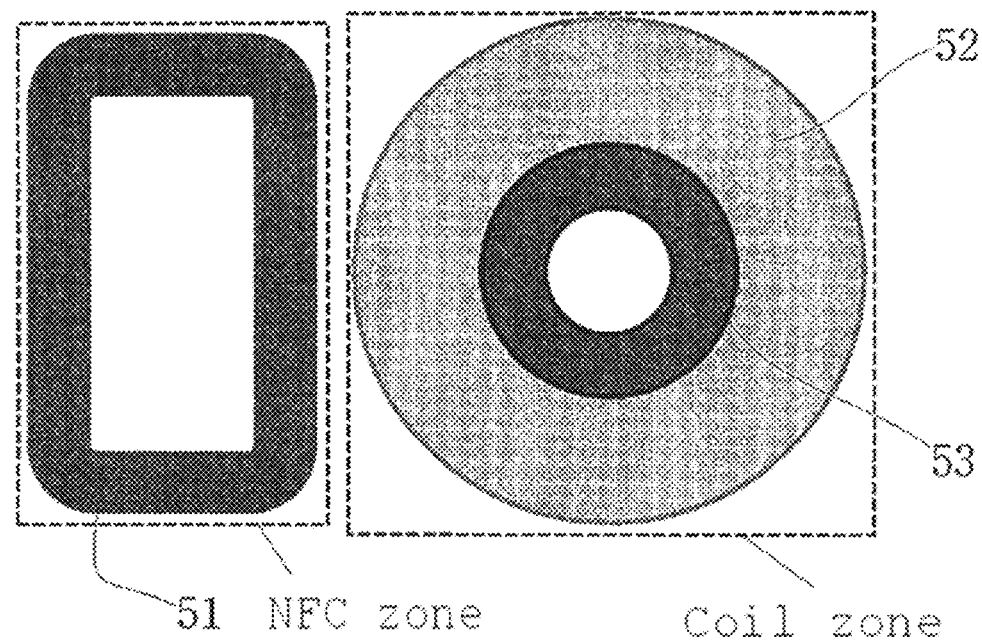
FIGS. 46 to 49 are views showing other embodiments of providing coils.

FIG. 46 is a view showing an embodiment of providing an NFC coil in a zone separated from those of wireless charging coils 52 and 53. That is, although the NFC coil is provided such that the wireless charging coils 52 and 53 are wound inside or outside the NFC coil, this is a figure showing that the NFC coil is provided in a completely separated zone.

Figure 47:
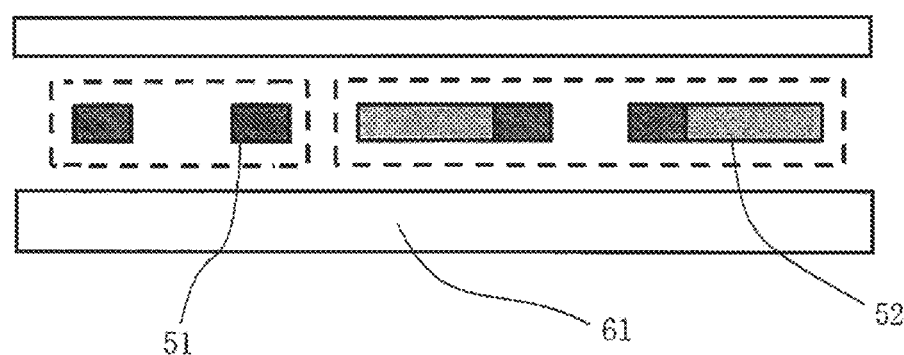

FIG. 47 is a view of an embodiment showing cross-sectional positions. This is a view showing that although the NFC coil and the wireless charging coils 52 and 53 are respectively provided in separated zones, they are provided at an upper portion of the lower case 61 of a cellular phone. Of course, it is apparent that they may be provided in the middle or at a lower portion of the lower case 61.

Figure 48:
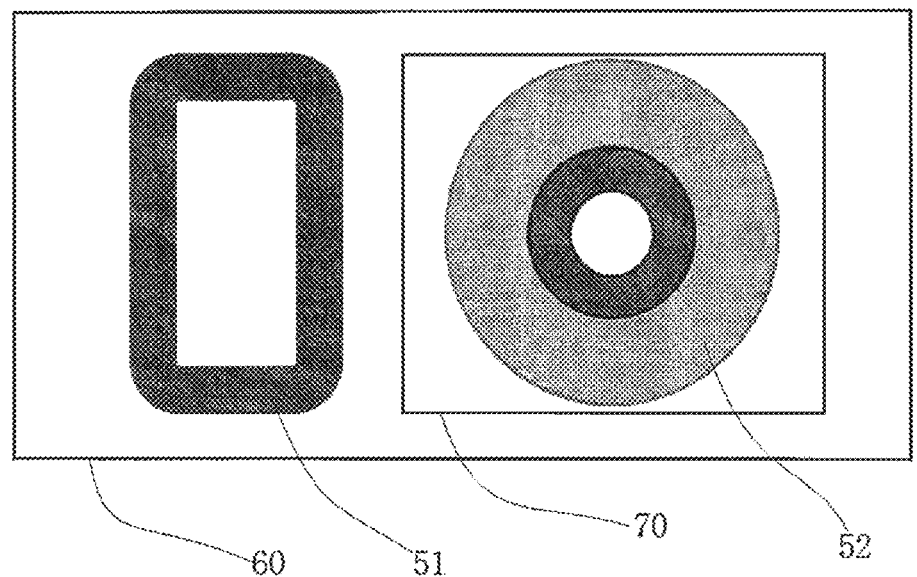
Figure 49:
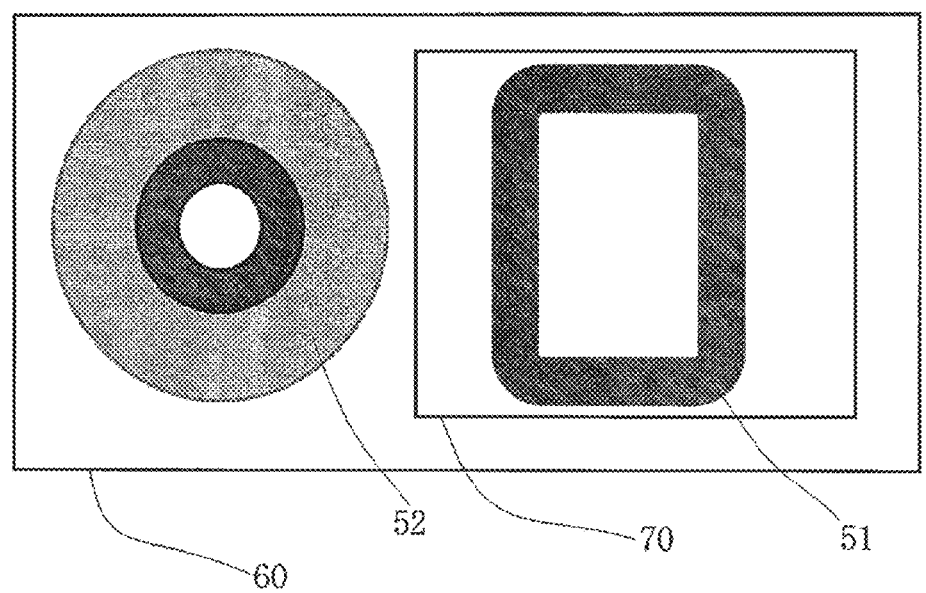

FIGS. 48 and 49 are views showing embodiments of providing the coils at different positions.

That is, FIG. 48 shows an embodiment of providing the NFC coil in a cellular phone (or a portable terminal) 60 and the wireless charging coils 52 and 53 on the surface of the battery 70, and FIG. 49 shows an embodiment of providing the wireless charging coils 52 and 53 in a cellular phone (or a portable terminal) 60 and the NFC coil on the surface of the battery 70.

At this point, providing the coils in a cellular phone 60 means that the coils may be provided in the lower case 61 or provided in the form of a film between the lower case and the parts of the cellular phone.

INDUSTRIAL APPLICABILITY

According to the present invention, since the shape of a coil in the reception unit is effectively designed in a wireless power system and, additionally, a structure capable of enhancing efficiency of magnetic fields of the reception unit is provided, it is possible to provide a reception unit for a wireless power system which can selectively receive wireless power according to the state of a wireless power transmission unit and obtain an effect of enhancing reception efficiency.

What is claimed is:

1. A portable communication device comprising:
   a front cover forming at least part of a front surface of the portable communication device;
   a rear cover forming at least part of a rear surface of the portable communication device;
   a battery disposed between the front cover and the rear cover; and
   a coil module disposed between the battery and the rear cover, the coil module including:
      a near field communication (NFC) coil,
      a wireless charging coil configured to receive wireless charging signals and to generate a charging energy for charging the battery, the wireless charging coil being substantially surrounded by the NFC coil such that a substantial portion of the wireless charging coil is spaced apart from the NFC coil by a distance greater than or equal to 1 millimeter, and
      a magnetic field shield member disposed between the battery and the wireless charging coil such that the magnetic field shield member covers the wireless charging coil.

2. The portable communication device of claim 1, wherein the magnetic field shield member is disposed between the rear cover and a part including the battery, a controller, and a circuit, within the portable communication device.

3. The portable communication device of claim 1, wherein the coil module further comprises an insulation film which wraps the wireless charging coil and the NFC coil.

4. The portable communication device of claim 1, wherein the magnetic field shield member, the wireless charging coil, and the NFC coil, are provided as one set.

5. The portable communication device of claim 1, wherein the magnetic field shield member comprises a silicon steel.

6. The portable communication device of claim 1, wherein the magnetic field shield member is further disposed between the NFC coil and the wireless charging coil.

* * * * *